(12) United States Patent
Kontani et al.

(10) Patent No.: US 12,446,169 B2
(45) Date of Patent: Oct. 14, 2025

(54) DISPLAY DEVICE, INPUT DEVICE, AND FRONT COVER MEMBER

(71) Applicant: Panasonic Intellectual Property Management Co., Ltd., Osaka (JP)

(72) Inventors: Masaki Kontani, Osaka (JP); Takeshi Masutani, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 303 days.

(21) Appl. No.: 18/052,176

(22) Filed: Nov. 2, 2022

(65) Prior Publication Data

US 2023/0292453 A1    Sep. 14, 2023

(30) Foreign Application Priority Data

Dec. 23, 2021   (JP) ................................ 2021-209327
Apr. 28, 2022   (JP) ................................ 2022-074459

(51) Int. Cl.
    *H05K 5/02*     (2006.01)
    *G06F 3/01*     (2006.01)
    *G06F 3/044*    (2006.01)
    *H05K 5/03*     (2006.01)

(52) U.S. Cl.
    CPC ........... *H05K 5/0217* (2013.01); *G06F 3/016* (2013.01); *G06F 3/044* (2013.01); *H05K 5/03* (2013.01)

(58) Field of Classification Search
    CPC ........ H05K 5/0217; H05K 5/03; G06F 3/016; G06F 3/041; G06F 3/044
    See application file for complete search history.

(56) References Cited

U.S. PATENT DOCUMENTS

| | | | |
|---|---|---|---|
| 11,175,438 B1* | 11/2021 | Hintikka | ................. H01L 33/54 |
| 2011/0063257 A1* | 3/2011 | Nojiri | ................... G06F 3/0421 |
| | | | 345/175 |

(Continued)

FOREIGN PATENT DOCUMENTS

| | | |
|---|---|---|
| JP | 2020024832 A | 2/2020 |
| JP | 2021005526 A | 1/2021 |

OTHER PUBLICATIONS

Philip E. Ciddor, "Refractive index of air: new equations for the visible and near infrared," Appl. Opt. 35, 1566-1573 (Year: 1996).*

(Continued)

*Primary Examiner* — Imani N Hayman
*Assistant Examiner* — Ross Terry Mularski
(74) *Attorney, Agent, or Firm* — Seed Intellectual Property Law Group LLP

(57) ABSTRACT

A display device includes: a front cover that is optically transmissive; a design sheet that is optically transmissive and is arranged on the front surface side or the back surface side of the front cover; a cushion layer that is optically transmissive and is arranged on the back surface side of the front cover; and a light source that is arranged on the back surface side of the cushion layer. The cushion layer includes a plurality of first recessed portions each of which is, in a cross-sectional view taken along a plane parallel to a stacking direction of the front cover and the design sheet, in a projecting shape in the stacking direction and is in a recessed shape on the back side of the projecting shape.

16 Claims, 14 Drawing Sheets

(56) References Cited

U.S. PATENT DOCUMENTS

| | | | |
|---|---|---|---|
| 2013/0335210 A1* | 12/2013 | Arai | G06F 1/1643 |
| | | | 340/407.2 |
| 2017/0270835 A1* | 9/2017 | Yang | H10K 77/111 |
| 2019/0250665 A1* | 8/2019 | Kim | G06F 1/1652 |
| 2022/0105877 A1* | 4/2022 | Yamamoto | H03K 17/962 |
| 2022/0164006 A1* | 5/2022 | Lee | B32B 3/266 |
| 2022/0256720 A1* | 8/2022 | Takagi | G04G 21/025 |

OTHER PUBLICATIONS

M. Fukuda et al., "Plastic module of laser diode and photodiode mounted on planar lightwave circuit for access network," Journal of Lightwave Technology, vol. 17, No. 9, pp. 1585-1592, Figure 3, Sep. 1999, doi: 10.1109/50.788564. (Year: 1999).*

Office Action, dated Sep. 2, 2025, for Japanese Patent Application No. 2022-074459. (7 pages) (with Machine Translation).

\* cited by examiner

DISPLAY DEVICE, INPUT DEVICE, AND FRONT COVER MEMBER

CROSS REFERENCE TO RELATED APPLICATIONS

The present application is based on and claims priority of Japanese Patent Application No. 2021-209327 filed on Dec. 23, 2021, and Japanese Patent Application No. 2022-074459 filed on Apr. 28, 2022.

FIELD

The present disclosure relates to display devices, input devices, and front cover members.

BACKGROUND

Conventionally, in a vehicle such as an automobile, a display device which produces a desired display, an input device which receives an input from a user such as a driver, and the like are installed. For example, PTL 1 discloses a switch device (input device) which can provide a soft feeling of an operation when a user operates it.

CITATION LIST

Patent Literature

PTL 1: Japanese Unexamined Patent Application Publication No. 2020-24832

SUMMARY

However, the input device disclosed in PTL 1 can be improved upon.

In view of this, the present disclosure provides a display device, an input device, and a front cover member capable of improving upon the above related art.

A display device according to one aspect of the present disclosure includes: a front cover that is optically transmissive; a design portion that is optically transmissive and is arranged on a front surface side or a back surface side of the front cover; a cushion layer that is optically transmissive and is arranged on the back surface side of the front cover; and a light source that is arranged on a back surface side of the cushion layer, and the cushion layer includes a plurality of recessed portions each of which is, in a cross-sectional view taken along a plane parallel to a stacking direction of the front cover and the design portion, in a projecting shape in the stacking direction and is in a recessed shape on a back side of the projecting shape.

An input device according to one aspect of the present disclosure includes: the display device described above; and a detector that is arranged on the back surface side of the cushion layer to detect an operation from a user.

A front cover member according to one aspect of the present disclosure includes: a front cover that is optically transmissive; a design portion that is optically transmissive and is arranged on a front surface side or a back surface side of the front cover; and a cushion layer that is optically transmissive and is arranged on the back surface side of the front cover, and the cushion layer includes a plurality of recessed portions each of which is, in a cross-sectional view taken along a plane parallel to a stacking direction of the front cover and the design portion, in a projecting shape in the stacking direction and is in a recessed shape on a back side of the projecting shape.

According to one aspect of the present disclosure, it is possible to realize a display device and the like which are capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

Figure 1:
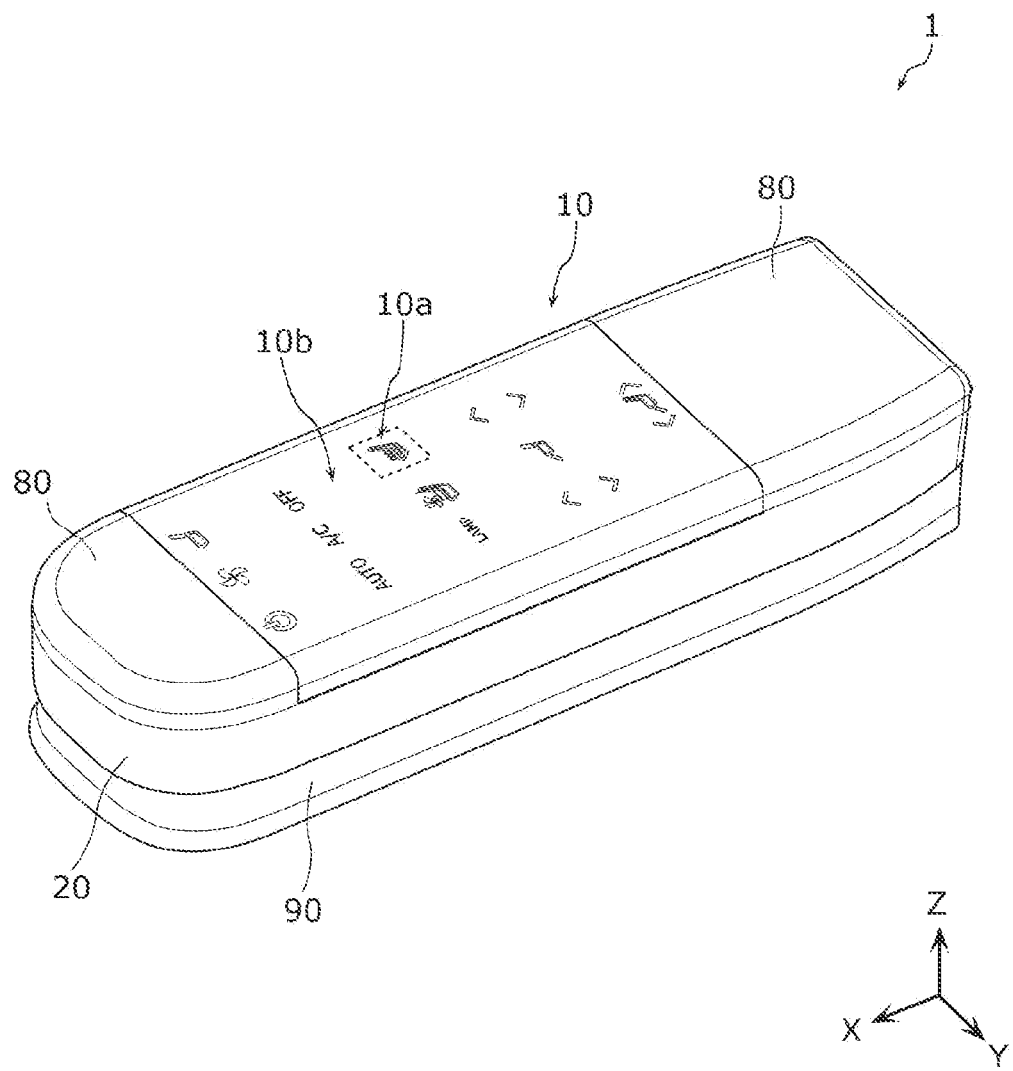
FIG. 1 is a perspective view showing an example of the appearance of an input device according to an embodiment.

DESCRIPTION OF EMBODIMENTS (Findings on which Present Disclosure is Based)

As described in "Background", the input device disclosed in PTL 1 can be improved upon. For example, although it may be desired that a display device, an input device, and a front cover member do not provide discomfort on a tactile sensation to a user when the user touches them, the input device disclosed in PTL 1 can be improved upon the prevention of provision of the discomfort. Hence, the present inventors have conducted a thorough study on a display device, an input device, and a front cover member in which discomfort on a tactile sensation is reduced in order to achieve further improvement on the display device, the input device, and the front cover member, with the result that the present inventors conceive a display device, an input device, and a front cover member below.

A display device according to one aspect of the present disclosure includes: a front cover that is optically transmissive; a design portion that is optically transmissive and is arranged on a front surface side or a back surface side of the front cover; a cushion layer that is optically transmissive and is arranged on the back surface side of the front cover; and a light source that is arranged on a back surface side of the cushion layer, and the cushion layer includes a plurality of recessed portions each of which is, in a cross-sectional view taken along a plane parallel to a stacking direction of the front cover and the design portion, in a projecting shape in the stacking direction and is in a recessed shape on a back side of the projecting shape.

In this way, a plurality of recessed portions each of which is in the projecting shape in the stacking direction and is in the recessed shape on the back side of the projecting shape are formed in the cushion layer, and thus the cushion layer is easily compressed and deformed when the front cover is pressed, with the result that it is possible to provide a soft tactile sensation to a user. The recessed portions are arranged, and thus the same tactile sensation can be provided in parts where the recessed portions are formed. Hence, it is possible to realize the display device in which discomfort on the tactile sensation is reduced.

For example, the plurality of recessed portions may be spaced, and the cushion layer may include a connection portion that connects adjacent recessed portions among the plurality of recessed portions.

In this way, the recessed portions connected by the connection portions are provided, and thus it is possible to realize the display device in which discomfort on the tactile sensation is reduced.

For example, each of the plurality of recessed portions may include a bottom surface portion, and may be inclined or curved to taper toward the bottom surface portion.

In this way, as compared with a shape in which the recessed portion is not tapered, the cushion layer is easily compressed and deformed. Hence, it is possible to realize the display device which can provide a softer tactile sensation.

For example, the recessed portion may include the bottom surface portion and a side surface portion that connects the bottom surface portion and the connection portion, and the thickness of the connection portion may be greater than the thickness of the side surface portion.

In this way, it is possible to suppress unevenness in brightness between the side surface portion and the connection portion, and thus it is possible to improve the appearance of designs.

For example, the thickness of the connection portion may increase toward each of the plurality of recessed portions.

In this way, it is possible to suppress an extreme change in brightness in a boundary between the side surface portion and the connection portion, and thus it is possible to further improve the appearance of the designs.

For example, the cushion layer may include a first cushion layer and a second cushion layer, each of the first cushion layer and the second cushion layer may include a plurality of recessed portions each of which is, in the cross-sectional view taken along the plane parallel to the stacking direction of the front cover and the design portion, in a projecting shape in the stacking direction and is in a recessed shape on a back side of the projecting shape, the second cushion layer may be in a shape obtained by inverting the first cushion layer in the stacking layer, and the second cushion layer may be arranged on a side of the first cushion layer, the side facing the front cover.

In this way, influences of opening portions on the tactile sensation can be decreased, and thus it is possible to further suppress the provision of discomfort on the tactile sensation to the user. The distance between adjacent recessed portions can be reduced, and thus it is possible to further suppress an extreme change in brightness in the boundary between the side surface portion and the connection portion, with the result that it is possible to further improve the appearance of the designs. As compared with a case where in one cushion layer, molding is performed such that the distance between adjacent recessed portions is reduced with respect to the height of the entire cushion layer, it is possible to reduce the depths of spaces in the cushion layers, with the result that it is possible to easily perform molding on the cushion layers.

For example, the cushion layer may include: a first part that is superimposed, in plan view of the display device, on a design formed on the design portion; and a second part that is around the first part, and the first part may be greater in optical transmittance than the second part.

In this way, the designs are displayed brightly, and thus it is possible to further improve the appearance of the designs.

For example, the first part may be transparent or may be colored to be optically transmissive, and the second part may be light-blocking.

In this way, it is possible to display the designs in a desired color.

For example, a light-blocking sheet may be arranged between the adjacent recessed portions.

In this way, when light enters one of adjacent recessed portions, the leakage of the light from the other recessed portion can be suppressed, and thus it is possible to further improve the appearance of the designs.

For example, the design portion may be arranged to be superimposed, in the stacking direction, on the plurality of recessed portions and the connection portion.

In this way, influences of the opening portions on the tactile sensation can be decreased, and thus even when any part of the recessed portions and the connection portion is pressed, the same tactile sensation can be provided to the user. Hence, it is possible to realize the display device in which discomfort on the tactile sensation is further reduced.

For example, the cushion layer may include a silicone rubber that is optically transmissive.

In this way, for example, the silicone rubber is molded, and thus it is possible to easily produce the cushion layer.

For example, the cushion layer may include light diffusing particles whose refractive index is different from a refractive index of the silicone rubber. For example, the design portion may include a silicone rubber that is optically transmissive and light diffusing particles whose refractive index is different from a refractive index of the silicone rubber.

In this way, it is possible to suppress unevenness in brightness between the side surface portion and the connection portion and unevenness in brightness inside the recessed portion, and thus it is possible to further improve the appearance of designs.

For example, each of the plurality of recessed portions may be quadrangular, hexagonal, or circular in plan view of the display device.

In this way, the recessed portion in a simple shape which is quadrangular, hexagonal, or circular is used, and thus it is possible to provide a soft tactile sensation to the user.

For example, the design portion may be a design sheet arranged on the back surface side of the front cover.

In this way, the design sheet is flexible, and thus it is possible to provide a soft tactile sensation to the user.

An input device according to one aspect of the present disclosure includes: the display device described above; and a detector that is arranged on the back surface side of the cushion layer to detect an operation from a user.

In this way, the same effects as in the display device described above are achieved.

For example, the cushion layer may be compressed and deformed by the front cover being pressed.

In this way, the cushion layer is compressed and deformed by pressing, and thus it is possible to realize the input device which can provide a soft tactile sensation to the user when the input device is operated.

For example, the detector may detect the operation from the user when the front cover is pressed in a state where the cushion layer is compressed and deformed.

In this way, when the cushion layer is compressed and deformed, the operation performed by the user can be detected, and thus it is possible to provide a soft tactile sensation before the detection of the operation performed by the user. When the input device includes a vibration device which stimulates the haptic perception of the user while the user operates the front cover, it is possible to suppress the absorption of vibrations caused by the vibration device by the cushion layer.

Embodiments described below show comprehensive or specific examples. Values, shapes, materials, constituent elements, the arrangement and connection form of the constituent elements, and the like which are shown in the embodiments below are examples and are not intended to limit the present disclosure. Among the constituent elements in the embodiments below, constituent elements which are not recited in independent claims will be described as arbitrary constituent elements. The drawings are schematic views and are not exactly shown. In the drawings, the same constituent elements are identified with the same reference signs.

In the present specification, the same terms such as parallel indicating a relationship between elements, the same terms such as quadrangular and circular indicating the shapes of elements, and the same values are expressions which not only indicate exact meanings but also mean substantially equivalent ranges including a difference of about a few percent (for example, about 10%).

In drawings used in the description of the embodiments below, coordinate axes may be shown. A Z-axis indicates a stacking direction in which constituent elements of an input device are stacked. An X-axis direction and a Y-axis direction are directions which are perpendicular to each other on a plane vertical to a Z-axis direction. In the embodiments and the like below, "in plan view" means viewing in the Z-axis direction, and "in a cross-sectional view" means viewing a cutaway view taken along a plane parallel to the stacking direction (Z-axis direction).

Embodiment

[1. Overall Configuration of Input Device]

Figure 2:
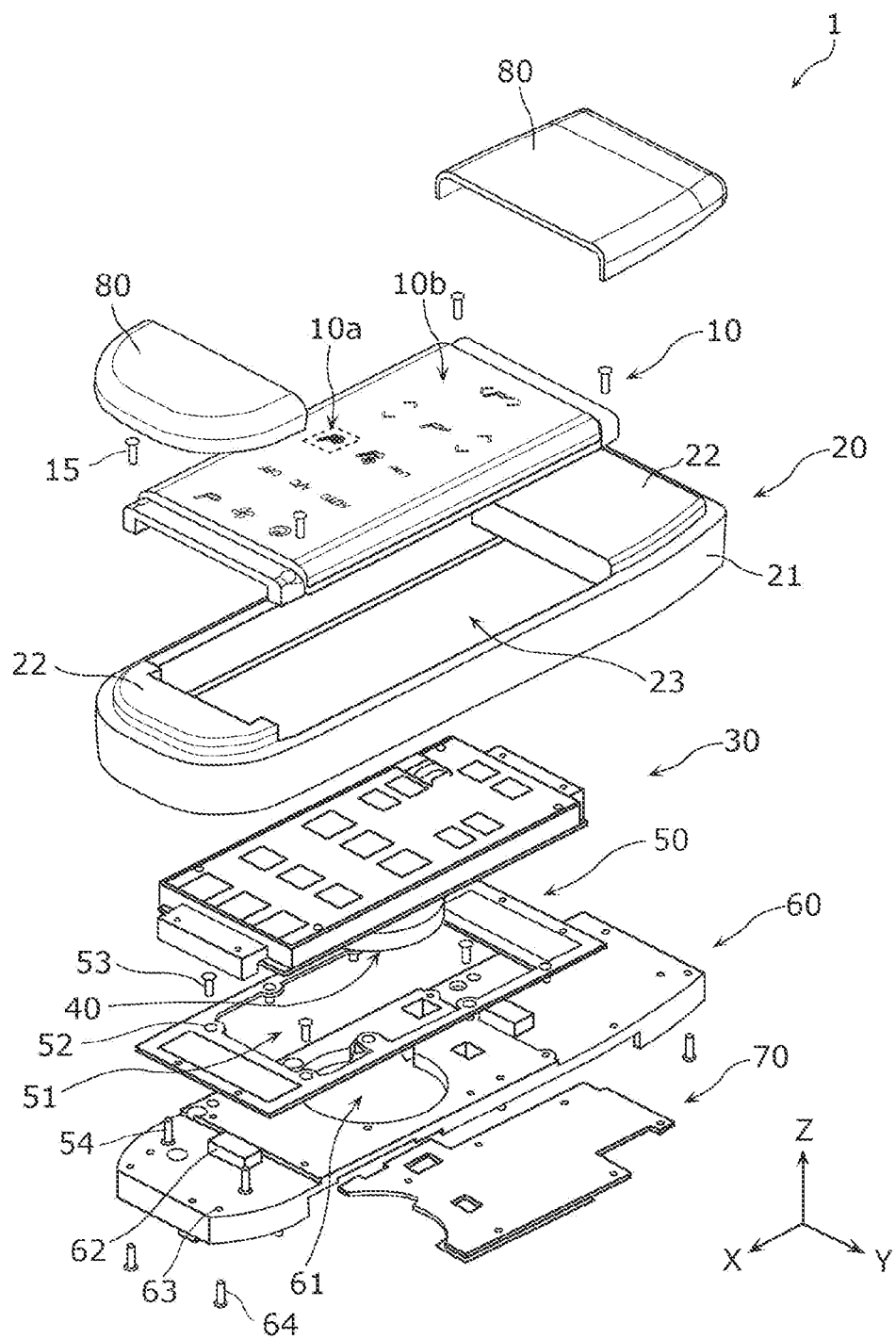
FIG. 2 is an exploded perspective view showing the input device according to the embodiment.

The overall configuration of input device 1 according to the present embodiment will first be described with reference to FIGS. 1 and 2. FIG. 1 is a perspective view showing an example of the appearance of input device 1 according to the present embodiment. FIG. 2 is an exploded perspective view showing input device 1 according to the present embodiment.

As shown in FIG. 1, input device 1 is a device that receives an input of an operation for controlling an appliance included in an object (for example, a vehicle such as an automobile) in which input device 1 is installed. Specifically, input device 1 receives a push operation (hereinafter also simply referred to as an operation) from a user on the surface of front cover portion 10.

When the object is a vehicle, the appliance is an in-vehicle appliance, and examples thereof include a car navigation system, an audio appliance for playing back optical discs, a video playback appliance, an air conditioning appliance and the like. However, the appliance is not limited to them.

The object in which input device 1 is installed is not limited to the vehicle. Input device 1 may be installed in an object for receiving an operation from the user, and may be, for example, installed in a home appliance or the like.

As shown in FIGS. 1 and 2, input device 1 includes front cover portion 10, main body 20, frame portion 30, vibration device 40, plate spring 50, chassis 60, main substrate 70, upper covers 80, and lower cover 90.

Predetermined designs are displayed on front cover portion 10, and front cover portion 10 is a user interface which receives an operation from the user. The user performs the operation on front cover portion 10 to be able to control appliances included in the vehicle. Front cover portion 10 is, for example, a plate-shaped member, and is pressed by the operation from the user. Front cover portion 10 is an example of a display member.

The predetermined designs are, for example, designs for controlling various types of appliances included in the vehicle in which input device 1 is installed. Although FIG. 1 shows an example where a plurality of designs are displayed on front cover portion 10, only one design may be displayed. Front cover portion 10 includes first regions 10*a* on which the designs are displayed and second region 10*b* on which no design is displayed.

First regions 10*a* are switch portions which functions as switches in input device 1. In other words, the switch portions in input device 1 are parts on which the designs are displayed. The user operates first region 10*a* corresponding to an appliance to be controlled, and thereby controls the appliance. Although in FIG. 1, one first region 10*a* is indicated by a dashed frame as an example, the shape of first region 10*a* is not limited to this example.

Second region 10*b* is a non-switch portion which does not function as a switch in input device 1. Even when the user operates second region 10*b*, the appliance is not controlled. Second region 10*b* is a region (region around the designs) around first regions 10*a* or a region (region sandwiched between the designs) between adjacent first regions 10*a*. Second region 10*b* is also said to be a region which is not operated by the user in order to control the appliance.

Input device 1 can be arranged in a place such as an armrest or a console where it is easy for the user to unintentionally touch input device 1. In other words, front cover portion 10 can be touched by the user even when the user does not operate the appliance. For example, even when the user places an arm on an armrest or the like, the user can touch front cover portion 10.

When the user touches front cover portion 10 for a purpose other than the purpose of controlling the appliance, in front cover portion 10, not only first regions 10a but also second region 10b can be touched by the user. For example, second region 10b can be touched by the user together with first region 10a. Here, when a tactile sensation (touch) differs between first region 10a and second region 10b, the user may feel discomfort with the tactile sensation. Hence, front cover portion 10 in the present embodiment is configured to obtain the same tactile sensation for first regions 10a and second region 10b. The configuration of front cover portion 10 will be described later.

Front cover portion 10 is fixed to main body 20, for example, with fastening members such as screws 15.

Main body 20 is a frame-shaped member which holds front cover portion 10 and houses frame portion 30, vibration device 40, plate spring 50, chassis 60, and main substrate 70. In the present embodiment, when front cover portion 10 is operated, main body 20 holds frame portion 30 (for example, frame 32) such that frame portion 30 can be moved (is movable) in a direction (Z-axis direction) in which front cover portion 10 (for example, front cover 11) and frame portion 30 (for example, frame 32 shown in FIG. 4) are stacked. Main body 20 includes frame portion 21 and a pair of regulators 22.

Frame portion 21 is a frame-shaped member, and has a size and a thickness (length in the Z-axis direction) large enough to house frame portion 30, vibration device 40, plate spring 50, chassis 60, and main substrate 70.

The pair of regulators 22 are respectively provided at end portions of one side (in the present embodiment, a Z-axis positive side) of the opening of frame portion 21. In a region sandwiched between the pair of regulators 22, opening 23 is formed. Opening 23 is the region which is surrounded by frame portion 21 and the pair of regulators 22 in plan view. For example, opening 23 may be equal in size to front cover 11 of front cover portion 10. Opening 23 is an opening in which front cover portion 10 is arranged.

Main body 20 sandwiches both ends of front cover portion 10 in the X-axis direction between the pair of regulators 22 and a pair of upper covers 80 so as to hold front cover portion 10. For example, opening 23 is blocked by front cover portion 10.

Although main body 20 is formed of a resin, a metal, or the like, the present disclosure is not limited to this configuration. Although frame portion 21 and the pair of regulators 22 are, for example, integrally formed, the present disclosure is not limited to this configuration.

Frame portion 30 is held in main body 20 such that, when front cover portion 10 is operated by the user, frame portion 30 can be moved in the direction (Z-axis direction) in which front cover portion 10 and frame portion 30 are stacked, and frame portion 30 is moved in the Z-axis direction by the operation performed on front cover portion 10 by the user. Frame portion 30 is held in main body 20 such that, no matter which of first region 10a and second region 10b is operated, frame portion 30 is moved in the Z-axis negative direction. Frame portion 30 presses, for example, plate spring 50 supporting frame portion 30 to move in the Z-axis negative direction relative to vibration device 40, chassis 60, and a pressing detector (see pressing detector 100 shown in FIG. 5) which will be described later. Frame portion 30 is in the shape of, for example, a plate, and is held in main body 20 so as to be parallel to front cover portion 10.

Frame portion 30 is arranged between front cover portion 10 and plate spring 50 and is pressed by plate spring 50 to the Z-axis positive side. Both ends of frame portion 30 in the X-axis direction abut on the pair of regulators 22 in main body 20, and thus the movement of frame portion 30 in the X-axis positive direction is regulated. In frame portion 30, the initial position of frame portion 30 in the Z-axis direction is determined by the pair of regulators 22 and plate spring 50. The initial position indicates a position in the Z-axis direction in a state where front cover portion 10 is not operated by the user. The configuration of frame portion 30 will be described later.

Vibration device 40 is an example of a haptic perception presenter which stimulates the haptic perception of the user while the user operates front cover portion 10. For example, vibration device 40 uses vibrations to provide a haptic perception to the user who operates front cover portion 10. Vibration device 40 is mechanically connected to frame portion 30 (for example, frame 32), and uses vibrations to provide a haptic perception via frame portion 30 and front cover portion 10 to the user who operates front cover portion 10. The mechanical connection here means that the vibrations of vibration device 40 are transmitted to frame portion 30 and thus frame portion 30 can be vibrated according to the vibrations of vibration device 40. In the present embodiment, vibration device 40 is directly fixed to frame portion 30.

Vibration device 40 includes a vibrator which generates vibrations. For example, the vibrator may be a piezoelectric element formed of a piezoelectric material or may be a motor, a solenoid, a voice coil, or the like which is electromagnetically operated. The vibrator may be a linear resonant actuator, an artificial muscle, a shape memory actuator, or the like.

Vibration device 40 is located to overlap frame portion 30 in plan view, and is arranged on an opposite side (Z-axis negative side of frame portion 30) to front cover portion 10 with respect to frame portion 30. For example, vibration device 40 is arranged around the center of frame portion 30 in plan view.

The haptic perception provided to the user is not limited to vibrations, and may be another perception, a haptic perception such as a friction feeling, or may be a haptic perception such as electrical current stimulation which is provided to sensory nerves. An element which provides the haptic perception to sensory nerves may be an element which generates an electrostatic friction feeling or the like. The haptic perception provided to the user may be, for example, a haptic perception which is provided without contact. An element which provides a haptic perception without contact may be an element which generates ultrasonic waves or air currents or the like.

Plate spring 50 is an elastic member which is arranged on the opposite side (Z-axis negative side) of frame portion 30 to front cover portion 10, abuts on frame portion 30, and pushes up frame portion 30 to the side of front cover portion 10 (Z-axis positive side). Plate spring 50 is bent by operating front cover portion 10, and thus frame portion 30 can be moved in the Z-axis negative direction. Although plate spring 50 has, for example, elasticity enough to prevent vibrations caused by vibration device 40 to frame portion 30 from being blocked, the elasticity is not limited to the elasticity described above.

Plate spring 50 is, for example, a frame-shaped member, and may abut on the periphery of frame portion 30. In plate spring 50, opening 51 for arranging vibration device 40 is formed.

In plate spring 50, screw holes 52 are formed. Plate spring 50 is fixed to chassis 60 with, for example, fastening members such as screws 53. Plate spring 50 is further fixed to frame portion 30 with, for example, fastening members such as screws 54.

Chassis 60 is a plate-shaped member, and plate spring 50 is fixed thereto. In chassis 60, opening 61 for arranging vibration device 40 is formed. In chassis 60, projecting portions 62 which protrude to sandwich opening 61 are provided. In chassis 60, screw holes 63 are formed. Chassis 60 is fixed to main body 20 with fastening members such as screws 64.

Main substrate 70 is a substrate on which various types of electronic components and the like are mounted. On main substrate 70, for example, a control circuit which realizes a controller (for example, controller 110 shown in FIG. 8) for controlling constituent elements included in input device 1 and the like are mounted. For example, main substrate 70 is arranged on the opposite side (Z-axis negative side) of chassis 60 to front cover portion 10. Although main substrate 70 is a plate-shaped member, the present disclosure is not limited to this configuration.

Upper covers 80 are members which cover both ends of front cover portion 10 in the X-axis direction in plan view. Upper covers 80 are, for example, plate-shaped members, and are flush with the surface of front cover portion 10 in a state where front cover portion 10 and upper covers 80 are attached to main body 20. The shapes of upper covers 80 are appropriately determined according to the plan view shapes of the pair of regulators 22. Although upper covers 80 are formed of, for example, a rubber, upper covers 80 may be formed of a resin material.

Lower cover 90 is a cover for blocking the other side (in the present embodiment, the Z-axis negative side) of the opening in frame portion 21 of main body 20. Although lower cover 90 is formed of a resin, a metal, or the like, the present disclosure is not limited to this configuration. Lower cover 90 may be formed of the same material as that of main body 20. In FIG. 2, lower cover 90 is omitted.

In input device 1 as described above, the user operates front cover portion 10, and thus frame portion 30 is moved in the Z-axis negative direction. In input device 1, pressing detector 100 arranged on the Z-axis negative side of frame portion 30 detects the movement of frame portion 30, and thus the operation performed on front cover portion 10 by the user is detected. Vibration device 40 is mechanically connected to frame portion 30 (for example, frame 32), and when pressing detector 100 detects the movement of frame portion 30, vibration device 40 vibrates to provide vibrations to the user via frame portion 30 and front cover portion 10. The detection of the movement of frame portion 30 means that the operation of front cover portion 10 is detected.

Vibration device 40 and upper covers 80 are not essential. Since input device 1 uses a tact switch as pressing detector 100 as described later, only the tact switch may be provided without the provision of vibration device 40. The tact switch includes, for example, a metal dome. The metal dome is a dish spring which is formed of stainless steel or the like, and can provide a haptic perception to the user. In other words, the tact switch uses the metal dome to be able to provide a feeling of an operation to the user. The tact switch is an example of pressing detector 100. In the present embodiment, a configuration in which the tact switch is used as pressing detector 100 and vibration device 40 is provided will be described. With this configuration, it is possible to provide, to the user, a haptic perception which cannot be expressed by the metal dome. When a tact switch which does not include the metal dome is used, vibration device 40 is provided, and thus a haptic perception can be provided to the user.

Input device 1 does not need to include pressing detector 100. Input device 1 which does not include pressing detector 100 does not have the function (switch function) of detecting the operation performed by the user, and functions as a display device for producing a desired display (for example, an alert display or the like).

[2. Configuration of Front Cover Portion]

Figure 3:
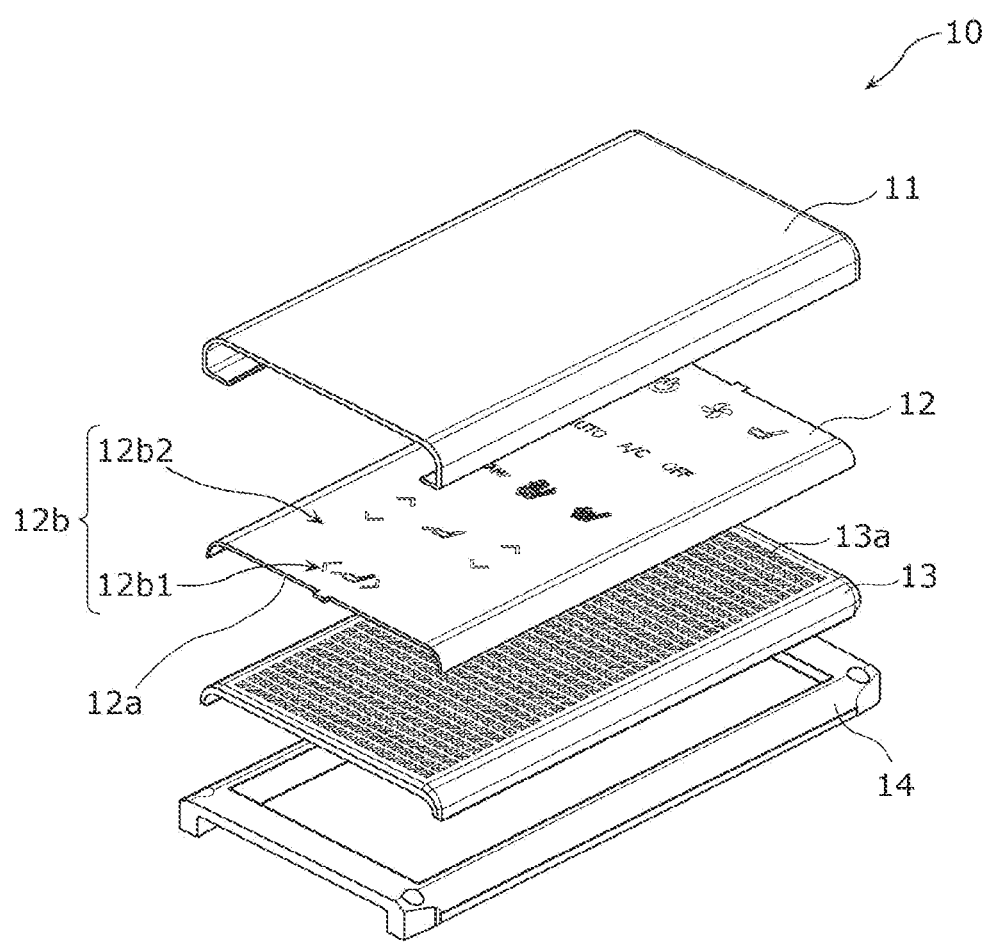
FIG. 3 is an exploded perspective view showing a front cover portion in the embodiment.

Then, the configuration of front cover portion 10 will be further described with reference to FIG. 3. FIG. 3 is an exploded perspective view showing front cover portion 10 in the present embodiment.

As shown in FIG. 3, front cover portion 10 includes front cover 11, design sheet 12 serving as an example of a design portion, cushion layer 13, and frame member 14. In the present embodiment, front cover 11, design sheet 12, and cushion layer 13 are stacked in this order. In other words, front cover portion 10 sandwiches design sheet 12 between front cover 11 and cushion layer 13. A decorative layer is formed with front cover 11, design sheet 12, and cushion layer 13.

Front cover 11 forms the front surface of input device 1, and is a part which is directly touched by the user. In the present embodiment, front cover 11 is optically transmissive to allow the user to visually recognize the designs. Front cover 11 covers, in plan view, from the side of the front surface (surface on the Z-axis positive side) of sheet portion 12a, both a part (for example, transmissive portion 12b1) of design sheet 12 on which the designs are formed and a part (for example, light-blocking portion 12b2) on which no design is formed. Front cover 11 covers, for example, entire design sheet 12 in plan view. In front cover 11, for example, a part which covers transmissive portion 12b1 and a part which covers light-blocking portion 12b2 are integrally formed. A part of front cover 11 which is touched by the user is formed in the shape of, for example, a plate. Front cover 11 is formed to cover all of a plurality of first recessed portions (for example, first recessed portions 13a shown in FIG. 5) which will be described later. In the present specification, being optically transmissive means being relatively greater in transmittance than a light-blocking part to be described later, and being optically transmissive may mean being, for example, greater in transmittance than or equal to 10%, greater in transmittance than or equal to 30%, or greater in transmittance than or equal to 50%.

Front cover 11 is formed of, for example, a material capable of reproducing a tactile sensation corresponding to the tactile sensation of a part where input device 1 is arranged. Front cover 11 may be formed of, for example, a material corresponding to the material (for example, the interior material) of the part where input device 1 is arranged. When front cover 11 is arranged to be embedded in a part formed of a leather-like material (for example, a genuine leather), front cover 11 is formed of, for example, an artificial leather which is optically transmissive or the like. Front cover 11 may be formed, for example, by impregnating a nonwoven fabric with a urethane resin or may be formed of, for example, a urethane thermoplastic elastomer.

Design sheet 12 forms the design portion, is arranged between front cover 11 and frame portion 30 and more specifically between front cover 11 and cushion layer 13, and is a layer on which the predetermined designs are formed. In the present embodiment, design sheet 12 includes sheet portion 12a and design layer 12b formed on sheet portion 12a.

Sheet portion 12a is a member that serves as a base on which design layer 12b is formed, and is, for example, a plate-shaped member which is optically transmissive. Sheet portion 12a is formed of an optically transmissive material. The material of sheet portion 12a may be the same as or different from that of cushion layer 13. Sheet portion 12a may be formed of a material which is more flexible than and has better printability than front cover 11. Sheet portion 12a may be formed of a material which has a smaller repelling force than front cover 11. Sheet portion 12a is formed to include an optically transmissive rubber. In the present embodiment, sheet portion 12a is a silicone rubber sheet which includes a transparent silicon rubber. When sheet portion 12a is a silicone rubber sheet, design layer 12b is easily formed on sheet portion 12a by printing. In terms of suppressing a decrease in printability, sheet portion 12a may be prevented from including voids. In the present specification, being transparent means being optically transmissive and not being colored. Being transparent may mean being, for example, greater in transmittance than or equal to 50% or greater in transmittance than or equal to 70%.

The thickness (which is the length in the Z-axis direction and corresponds to the wall thickness of sheet portion 12a) of sheet portion 12a may be small so that, when front cover portion 10 is operated, sheet portion 12a is easily and locally bent. Sheet portion 12a may be thinner than front cover 11. The thickness of sheet portion 12a may be, for example, less than or equal to 2.0 mm, more preferably less than or equal to 1.0 mm, and further preferably less than or equal to 0.5 mm. When input device 1 is provided in a part formed of a genuine leather, sheet portion 12a is thin, and thus a tactile sensation caused when the user operates front cover portion 10 can be brought close to a tactile sensation caused by pressing the genuine leather. Sheet portion 12a is thin, and thus it is possible to suppress the influence of the elasticity of sheet portion 12a. The thickness of sheet portion 12a is not limited to the thickness described above, and may be appropriately determined according to the material and the like.

In sheet portion 12a, for example, a part where transmissive portion 12b1 is formed and a part where light-blocking portion 12b2 is formed are integrally formed.

Design layer 12b is a print layer which is formed on sheet portion 12a by printing. Although design layer 12b is formed on the front surface of sheet portion 12a, design layer 12b may be formed on the back surface (surface on the Z-axis negative side) of sheet portion 12a.

Design layer 12b includes: transmissive portion 12b1 which transmits light from light source 33 (see light source 33 shown in FIG. 4) included in frame portion 30; and light-blocking portion 12b2 which blocks the light from light source 33. The designs are displayed by light passing through transmissive portion 12b1 of design layer 12b. Although in FIG. 3, for ease of understanding, transmissive portion 12b1 is shown in black and light-blocking portion 12b2 is shown in white, in actuality, transmissive portion 12b1 is transparent, and the part other than transmissive portion 12b1 is colored in black to form light-blocking portion 12b2.

Transmissive portion 12b1 forms first regions 10a, and light-blocking portion 12b2 forms second region 10b. For example, it is also said that first regions 10a are transmissive regions which are formed on sheet portion 12a by printing to form the designs and second region 10b is a light-blocking region which is formed on sheet portion 12a by printing. For example, the transmissive regions may be regions on which a print material for forming the light-blocking region is not printed. Transmissive portion 12b1 is an example of a first part, and light-blocking portion 12b2 is an example of a second part.

Design layer 12b is not limited to the configuration described above, and for example, design layer 12b may be formed by printing (coating) the entire surface of sheet portion 12a in black and removing a black paint by laser cutting to form a shape corresponding to transmissive portion 12b1. Hence, in the present embodiment, the printing means not only the printing of the light-blocking region on sheet portion 12a but also the coating of the entire surface of sheet portion 12a in black.

Cushion layer 13 is a cushioning layer which is provided for giving a soft tactile sensation to the user when the user operates front cover portion 10. Cushion layer 13 is arranged on the back surface side (Z-axis negative side) of design sheet 12 with respect to front cover 11.

Cushion layer 13 covers, in plan view, from the back surface side of sheet portion 12a, both a part (for example, transmissive portion 12b1) of design sheet 12 where the designs are formed and a part (for example, light-blocking portion 12b2) where no design is not formed. Cushion layer 13 is optically transmissive to guide light to transmissive portion 12b1. For example, cushion layer 13 covers entire design sheet 12 in plan view. Cushion layer 13 is formed in the shape of, for example, a plate. In cushion layer 13, for example, a part which covers transmissive portion 12b1 and a part which covers light-blocking portion 12b2 are integrally formed.

Cushion layer 13 has a higher degree of cushioning than sheet portion 12a. Although a detailed description will be given with reference to FIG. 5, cushion layer 13 in the present embodiment has a shape which can be compressed and deformed by pressing on front cover 11. Cushion layer 13 is formed to include an optically transmissive material. In the present embodiment, cushion layer 13 is formed to include a transparent silicone rubber. In this way, for example, the silicone rubber is molded, and thus it is possible to easily produce cushion layer 13 using a general material. Cushion layer 13 is transparent, and thus the light from light source 33 can be transmitted without the color of the light being changed. Cushion layer 13 may be formed to include a urethane thermoplastic elastomer or a urethane rubber.

Even when cushion layer 13 is formed to include the silicone rubber, cushion layer 13 has the shape which can be compressed and deformed, and thus cushion layer 13 is easily crushed by pressing on front cover 11 (the thickness of cushion layer 13 is partially reduced), with the result that a soft tactile sensation is easily provided to the user. In terms of providing a softer tactile sensation to the user, the hardness of the silicone rubber is preferably less than or equal to, for example, A40.

In terms of easily providing a soft tactile sensation to the user when the user operates front cover portion 10, the height (length in the Z-axis direction) of cushion layer 13 may be great. For example, the height of cushion layer 13 may be greater than that of design sheet 12 (for example, sheet portion 12a). The height of cushion layer 13 may also be greater than that of front cover 11. The height relationship between cushion layer 13 and front cover 11 and design sheet 12 is not limited to the relationship described above, and may be appropriately determined according to the material and the like.

In the present embodiment, cushion layer 13 does not include a foamable resin or the like. Since inside a cushion material obtained by foaming a foamable resin, voids having, for example, different sizes and shapes may be present, it may be difficult to cause an in-plane operation load to be constant. In other words, as compared with the silicone rubber, a change in operability easily occurs depending on the position in which front cover 11 is operated. On the other hand, since in the present embodiment, cushion layer 13 is formed to include the silicone rubber, an in-plane operation load can easily be caused to be constant. Hence, as compared with a case where the cushion layer is formed to include a foamable resin or the like, it is possible to realize input device 1 in which its operability is improved.

As described above, each of front cover 11 and cushion layer 13 is formed to straddle transmissive portion 12b1 and light-blocking portion 12b2 in plan view. It is also said that each of front cover 11 and cushion layer 13 is formed to straddle first regions 10a and second region 10b in plan view. It is also said that each of front cover 11 and cushion layer 13 is formed to straddle the switch portions and the non-switch portion in plan view.

In the present embodiment, front cover 11 and cushion layer 13 cover entire design sheet 12 in plan view. For example, front cover 11, design sheet 12, and cushion layer 13 may be equal in size to each other in plan view. In the region of front cover portion 10 which may be touched by the user, in plan view, a three-layer structure of front cover 11, design sheet 12, and cushion layer 13 is provided. For example, in front cover portion 10, each of a cross-sectional structure of first regions 10a and a cross-sectional structure of second region 10b has a three-layer structure of front cover 11, design sheet 12, and cushion layer 13, and in each of the layers, the materials of the part of first regions 10a and the part of second region 10b are the same as each other.

For example, front cover 11, design sheet 12, and cushion layer 13 are in contact with each other to be stacked. For example, front cover 11, design sheet 12, and cushion layer 13 are held in main body 20 such that plate-shaped portions are parallel to each other.

Although the plan view shapes of front cover 11, design sheet 12, and cushion layer 13 are rectangular, they may be, for example, square, circular, or L-shaped, and the shapes are not particularly limited. The present disclosure is not limited to a configuration in which front cover 11 and cushion layer 13 cover entire design sheet 12 in plan view, and front cover 11 and cushion layer 13 may cover at least one of first regions 10a and second region 10b.

Although an example where design layer 12b is formed on sheet portion 12a is described above, the present disclosure is not limited to this example. When front cover 11 includes a material capable of forming design layer 12b by printing, design layer 12b may be directly formed on front cover 11 by printing. Design layer 12b may be formed on the front surface (surface on the Z-axis positive side) of front cover 11, and when front cover 11 is optically transmissive, design layer 12b may be formed on the back surface (surface on the Z-axis negative side).

When design layer 12b is formed on front cover 11, front cover portion 10 does not need to include sheet portion 12a. In other words, the design portion may be formed with design layer 12b which is formed (for example, printed) on front cover 11. For example, design layer 12b is formed on front cover 11, front cover 11 and cushion layer 13 may be directly stacked.

Frame member 14 is a frame-shape member which is rigid, and supports outer edges of front cover 11, design sheet 12, and cushion layer 13.

In FIG. 3, the fastening members such as screws 15 for fixing the constituent elements are omitted.

[3. Configuration of Frame Portion]

Figure 4:
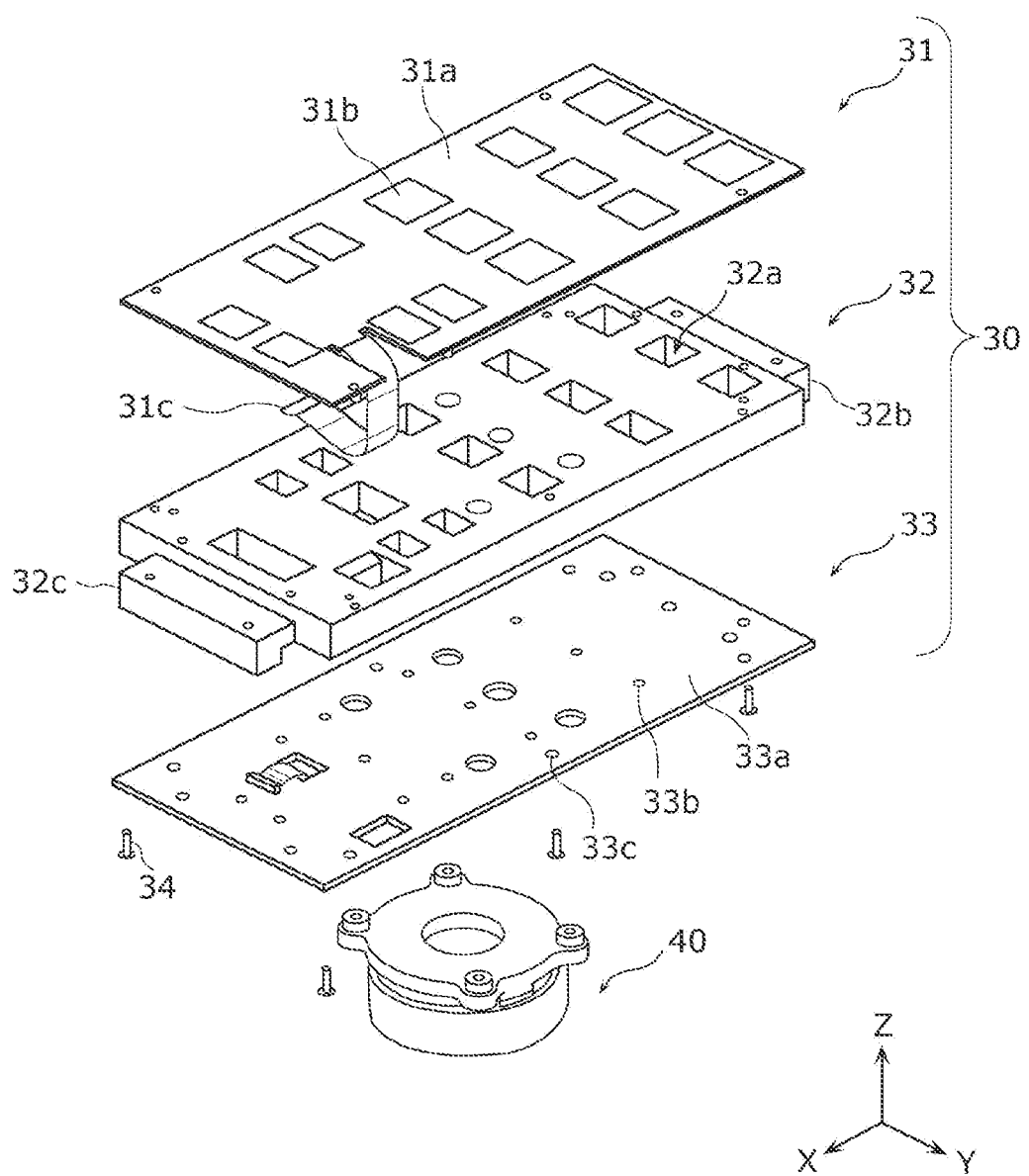
FIG. 4 is an exploded perspective view showing a frame portion in the embodiment.

Then, the configuration of frame portion 30 will be further described with reference to FIG. 4. FIG. 4 is an exploded perspective view showing frame portion 30 in the present embodiment. In FIG. 4, vibration device 40 is also shown.

As shown in FIG. 4, frame portion 30 includes sensor film 31, frame 32, and light source 33. Frame portion 30 is arranged opposite front cover portion 10. Vibration device 40 is arranged on the opposite side (Z-axis negative side) of light source 33 to front cover 11.

Sensor film 31 is a sensor which is arranged on the opposite side (Z-axis negative side) of cushion layer 13 to front cover 11 to detect a position in which the user operates (presses) front cover 11. Sensor film 31 is arranged between cushion layer 13 and frame 32. In the present embodiment, sensor film 31 is a capacitive sensor film (electrostatic sensor film). Sensor film 31 covers, in plan view, from the side of the back surface (surface on the Z-axis negative side) of sheet portion 12a, both transmissive portion 12b1 in design sheet 12 on which the designs are formed and light-blocking portion 12b2 on which no design is formed. It is also said that sensor film 31 is formed to straddle transmissive portion 12b1 and light-blocking portion 12b2 in plan view. For example, sensor film 31 covers entire design sheet 12 in plan view. In sensor film 31, for example, a part which covers transmissive portion 12b1 and a part which covers light-blocking portion 12b2 are integrally formed.

Sensor film 31 includes plate-shaped base member 31a, sensor electrodes 31b arranged on base member 31a, and flexible substrate portion 31c for connecting to main substrate 70. In the present embodiment, base member 31a and sensor electrodes 31b are optically transmissive. In other words, in the present embodiment, base member 31a is a transparent substrate, and sensor electrodes 31b are transparent electrodes. Sensor electrodes 31b are also said to be electrostatic sensor electrodes.

Base member 31a is a film on which sensor electrodes 31b are formed. Base member 31a is not limited to the film, and may be a transparent substrate.

Sensor electrodes 31b are arranged according to the designs formed on design sheet 12, and are, for example, arranged in respective positions opposite a plurality of designs. Each of sensor electrodes 31b is provided to overlap at least a part of the corresponding design in plan view. For example, sensor electrodes 31b are provided to include the designs in plan view. For example, sensor electrodes 31b are provided for the designs in a one-to-one relationship.

The present disclosure is not limited to a configuration in which a plurality of sensor electrodes 31b are arranged, and for example, when only one design is provided, only one sensor electrode 31b may be arranged.

For example, first regions 10a may be regions on which sensor electrodes 31b are provided in plan view. For example, second region 10b may be a region on which sensor electrodes 31b are not provided in plan view.

The present disclosure is not limited to a configuration in which sensor film 31 is a capacitive type, and a configuration may be adopted in which sensor film 31 uses another type such as an ultrasonic type or an electromagnetic induction type to detect the position of front cover portion 10 operated by the user.

Flexible substrate portion 31c is a substrate for outputting, to main substrate 70, the results of detection performed by sensor electrodes 31b. One end of flexible substrate portion 31c is connected to a connector or the like in main substrate 70, and thus sensor film 31 and main substrate 70 are electrically connected.

Sensor film 31 may further include an electrostatic integrated circuit (IC) (not shown) which serves as a processor for detecting a position touched by a finger of the user based on a change in capacitance resulting from the user touching front cover 11. For example, the electrostatic IC outputs, to controller 110, position information indicating the position touched by the finger of the user.

Frame 32 is moved in the Z-axis negative direction by receiving pressing in the Z-axis negative direction from front cover portion 10 resulting from the user operating front cover portion 10. Frame 32 is a plate-shaped member which is arranged on the opposite side (Z-axis negative side) of cushion layer 13 to front cover 11. In the present embodiment, frame 32 is arranged between sensor film 31 and light source 33. Frame 32 is rigid. In the present embodiment, frame 32 is optically transmissive.

Frame 32 is provided to cover front cover 11, design sheet 12, and cushion layer 13 in plan view. Frame 32 is formed to straddle first regions 10a and second region 10b in plan view. In the present embodiment, frame 32 covers the entire plate-shaped parts (parts touched by the user) of front cover 11, design sheet 12, and cushion layer 13 in plan view. In this way, frame 32 is likewise moved in the Z-axis negative direction even when the user operates first region 10a or second region 10b. In other words, frame 32 is moved even when the user operates second region 10b. For example, frame 32 is held in main body 20 to be parallel to cushion layer 13.

In frame 32, through holes 32a are formed which are spaces for transmitting the light from light source 33. For example, through holes 32a are provided to respectively correspond to a plurality of light emitting elements 33b included in light source 33. For example, it is also said that through holes 32a are provided to correspond to the designs on design sheet 12. It is also said that since the light is transmitted via through holes 32a, frame 32 is optically transmissive.

In the present embodiment, the design on design sheet 12 is smaller than a fingertip, and thus the size of through hole 32a is smaller than the fingertip so as to correspond to the size of the design. Hence, it is unlikely that, when a pressing operation is performed, front cover portion 10 is bent to make it difficult to press front cover portion 10. However, when the size of through hole 32a is increased as the design is larger than the fingertip, and thus front cover portion 10 is bent at the time of the pressing operation, light guides (not shown) for guiding the light from light emitting elements 33b may be provided in through holes 32a. In other words, frame 32 may include the light guides in parts of frame 32 opposite the designs and light source 33 (for example, light emitting elements 33b). The light guides are not limited to the configuration described above, and the light guides may be used in a configuration in which the design is smaller than the fingertip.

The present disclosure is not limited to a configuration in which through holes 32a are formed in frame 32, and through holes 32a do not need to be formed. In this case, for example, frame 32 is formed by two-color molding using an optically transmissive resin and a light-blocking resin.

Frame 32 includes end portion 32b which is a projecting portion protruding to an X-axis negative side and end portion 32c which is a projecting portion protruding to an X-axis positive side. For example, end portions 32b and 32c are parts which abut on plate spring 50.

For example, sensor film 31 and light source 33 are fixed to frame 32 with fastening members such as screws.

Light source 33 is arranged on the opposite side (Z-axis negative side) of frame 32 to cushion layer 13 to illuminate the designs. Light source 33 includes substrate 33a and a plurality of light emitting elements 33b.

Substrate 33a is a plate-shaped member on which a plurality of light emitting elements 33b are arranged. Although substrate 33a is a rigid substrate, substrate 33a may be a flexible substrate.

Light emitting elements 33b emit light for displaying the designs. Light emitting elements 33b are respectively provided for the designs. For example, light emitting elements 33b are respectively arranged in positions of substrate 33a opposite the designs. Although light emitting elements 33b are, for example, light emitting diodes (LEDs), light emitting elements 33b are not limited to the light emitting diodes.

Each of light emitting elements 33b may emit light of a different color (for example, a color corresponding to the design) or light emitting elements 33b may emit light of one color (for example, white).

Screws 34 are fastening members for fixing substrate 33a to frame 32.

In the present embodiment, vibration device 40 is fixed to frame portion 30 together with substrate 33a. Hence, substrate 33a and vibration device 40 are provided in direct contact with frame portion 30 regardless of whether frame portion 30 is moved in the Z-axis negative direction.

In frame portion 30 as described above, for example, when front cover portion 10 is operated by the user, sensor film 31, frame 32, and light source 33 are moved together in the Z-axis direction.

Sensor film 31 is not essential.

[4. Cross-Sectional Structure of Input Device]

Figure 5:
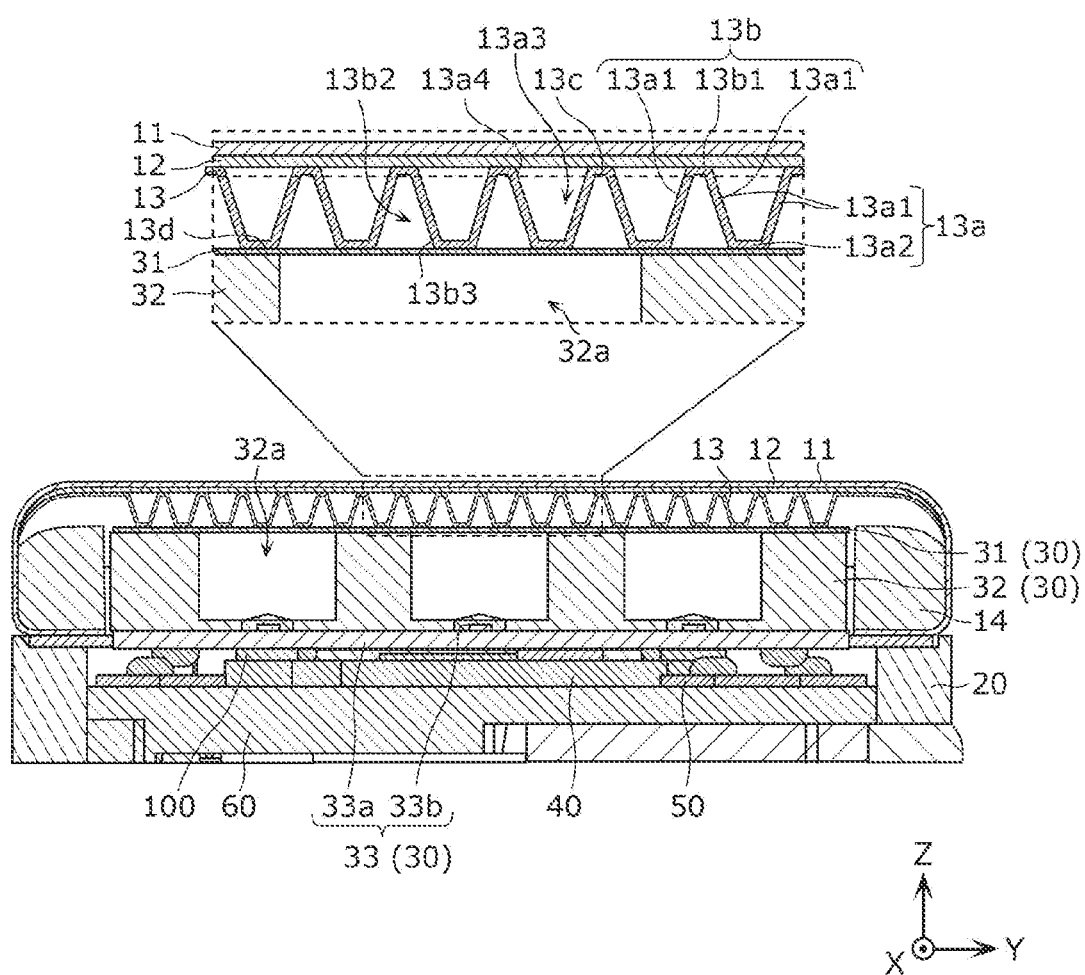
FIG. 5 is a cross-sectional view showing the input device according to the embodiment.

Then, the cross-sectional structure of input device 1 will be further described with reference to FIG. 5. FIG. 5 is a cross-sectional view showing input device 1 according to the present embodiment. FIG. 5 shows a cross-sectional view of input device 1 in a state where front cover portion 10 is not operated by the user, that is, in an initial state. FIG. 5 shows a cross-sectional view of input device 1 taken along a YZ plane parallel to the Z-axis direction.

As shown in FIG. 5, in input device 1, front cover portion 10, frame 32, light source 33, plate spring 50, and chassis 60 are held parallel to each other in this order from a front surface side (Z-axis positive side). Front cover portion 10 is integrally formed from an end portion on the X-axis positive side to an end portion on the X-axis negative side. In other words, front cover portion 10 has the same structure and material in first regions 10a and second region 10b.

The light emitted by light emitting elements 33b of light source 33 passes through through holes 32a and front cover portion 10 and is emitted to the outside of input device 1. In this way, input device 1 can cause the user to visually recognize a display corresponding to the designs formed on design sheet 12.

Design sheet 12 covers first recessed portions 13a and connection portions 13b1. For example, design sheet 12 covers all of a plurality of first recessed portions 13a and a plurality of connection portions 13b1. For example, design sheet 12 is arranged to be superimposed on first recessed portions 13a and connection portions 13b1 in plan view.

Input device 1 may further include, on the opposite side (Z-axis negative side) of frame portion 30 to front cover portion 10, pressing detector 100 for detecting that the user operates front cover portion 10. Pressing detector 100 is formed with, for example, the tact switch. Although pressing detector 100 is arranged at an end portion of substrate 33a in the X-axis direction, the present disclosure is not limited to this arrangement. Pressing detector 100 is mechanically connected to frame 32. Here, the mechanical connection means that pressing detector 100 can detect the movement of frame 32 in the Z-axis negative direction.

Pressing detector 100 is arranged on the back surface side (Z-axis negative side) of cushion layer 13 to detect the operation (for example, pressing) from the user. Pressing detector 100 detects the operation from the user, for example, when front cover 11 is further pressed in a state where cushion layer 13 is compressed and deformed. Pressing detector 100 detects the operation from the user, for example, when a load beyond a certain amount is applied to front cover 11. Pressing detector 100 detects pressing, for example, when front cover 11 is further pressed in the state where cushion layer 13 is compressed and deformed. The state where cushion layer 13 is compressed and deformed means a state where cushion layer 13 is compressed and deformed a predetermined amount or more, and may mean a state where cushion layer 13 is no longer compressed and deformed or a state where cushion layer 13 is unlikely to be compressed and deformed as compared with the initial state.

Pressing detector 100 may be a load sensor which detects, based on the movement of frame 32 in the Z-axis negative direction caused by the operation of front cover portion 10, a load applied to front cover portion 10. Although the load sensor is not particularly limited as long as it can detect the load applied to front cover portion 10, the load sensor is, for example, a piezoelectric sensor. The load sensor includes, for example, a piezoelectric element. For example, pressing detector 100 may be a stroke sensor which detects the load applied to front cover portion 10 as the amount of displacement of frame portion 30 (for example, frame 32). The stroke sensor uses, for example, an optical sensor, a radio wave sensor, a sound wave sensor, or the like to detect the amount of displacement of frame portion 30 as the amount of stroke. The stroke sensor can detect, for example, a small amount of stroke which is about 0.1 mm. The stroke sensor may detect, for example, an amount of stroke which is about 0.1 mm to detect that the user operates front cover portion 10. The tact switch used in the present embodiment can also detect an amount of stroke which is about 0.1 to 0.2 mm. Pressing detector 100 outputs the result of the detection to controller 110 which will be described later.

Pressing detector 100 may be a contact type or a non-contact type. Pressing detector 100 may be a capacitive type or a mechanical type. When input device 1 includes a switch such as the tact switch, the sensors such as the load sensor described above do not need to be provided. Pressing detector 100 is an example of a detector.

Cushion layer 13 includes a plurality of first recessed portions 13a each of which is in a projecting shape in the stacking direction and is in a recessed shape on the back side of the projecting shape. In cushion layer 13, the first recessed portions 13a are spaced. Cushion layer 13 includes: the first recessed portions 13a which are arranged on one (in the example of FIG. 5, front surface 13c) of front surface 13c (surface on the Z-axis positive side) and back surface 13d (surface on the Z-axis negative side); and the connection portions 13b1 each of which connects adjacent first recessed portions 13a. On the other (in the example of FIG. 5, back surface 13d) of front surface 13c in connection portion 13b1 and back surface 13d, space 13b2 is formed. In cushion layer 13, in plan view, first recessed portions 13a and connection portions 13b1 are alternately and continuously formed. Cushion layer 13 is also said to be in a three-dimensional shape (recessed-projecting shape) connected by thin walls in plan view. For example, in terms of providing a soft tactile sensation to the user, cushion layer 13 may be thin in wall thickness, and is, for example, thinner than design sheet 12 (for example, sheet portion 12a). However, the present disclosure is not limited to this configuration.

First recessed portion 13a is a part of cushion layer 13 on the side of sensor film 31 (Z-axis negative side) with respect to a dashed line in FIG. 5, and is in a shape which is recessed from front surface 13c (in other words, in the example of FIG. 5, an end portion of connection portion 13b1 in the Y-axis direction) of cushion layer 13 to the side of light source 33 (Z-axis negative side). First recessed portion 13a is inclined to taper toward the Z-axis negative side. First recessed portion 13a is in a projecting shape in a downward direction (Z-axis negative side), and is also said to include space 13a3 on the back side (front surface side of cushion layer 13) of a projecting portion. First recessed portion 13a is a projecting portion of a thin wall thickness protruding in the downward direction, and is also said to be a projecting portion including opening portion 13a4 in an upward direction. The thin wall thickness here means, for example, that the wall thickness of first recessed portion 13a is less than at least one of the wall thicknesses of front cover 11 and design sheet 12.

First recessed portion 13a includes two side surface portions 13a1 and bottom surface portion 13a2 between two side surface portions 13a1. First recessed portion 13a is an example of a recessed portion. First recessed portion 13a may be in a projecting shape in the upward direction (Z-axis positive direction) and include space 13a3 on the back side of the projecting portion. The dashed line is a straight line which connects the bottom surface side (Z-axis negative side) of connection portions 13b1.

Side surface portion 13a1 is a part which connects connection portion 13b1 and bottom surface portion 13a2, and in the present embodiment, side surface portion 13a1 is a plate-shaped member in which the inside of first recessed portion 13a is inclined to taper. The cross-sectional shapes of both surfaces of side surface portion 13a1 are, for example, linear. It is also said that two side surface portions 13a1 included in first recessed portion 13a are inclined in a tapered shape in which a distance (in the example of FIG. 5, a length in the Y-axis direction) between two side surface portions 13a1 is gradually decreased toward the Z-axis negative side. The present disclosure is not limited to a configuration in which side surface portions 13a1 are inclined, and for example, side surface portions 13a1 may be curved to taper or may be plate-shaped members parallel to the Z-axis direction.

Bottom surface portion 13a2 is a part which connects the end portions of adjacent side surface portions 13a1 on the Z-axis negative side, and is arranged on the Z-axis negative side of cushion layer 13. In the present embodiment, bottom surface portion 13a2 is arranged on the Z-axis negative side with respect to the connection portion. Bottom surface portion 13a2 forms the bottom surface of first recessed portion 13a. Bottom surface portion 13a2 overlaps opening portion 13a4 in plan view, and is smaller than opening portion 13*a*4. The front surface (back surface 13*d*) of bottom surface portion 13*a*2 is, for example, provided in contact with sensor film 31.

In first recessed portion 13*a*, space 13*a*3 and opening portion 13*a*4 are formed.

Space 13*a*3 is a space which is formed by the recessed shape on the back side of the projecting shape. Space 13*a*3 is surrounded by side surface portions 13*a*1 and bottom surface portion 13*a*2. In space 13*a*3, for example, air is present. Space 13*a*3 is in the shape of a truncated cone, and may be, for example, in the shape of a tetragonal pyramid. A part of space 13*a*3 overlaps a part of space 13*b*2 in plan view.

Opening portion 13*a*4 is a boundary between space 13*a*3 and an external space, and is covered by design sheet 12 in the present embodiment. In other words, opening portion 13*a*4 is formed on the side of cushion layer 13 which is operated by the user. All opening portions 13*a*4 formed in cushion layer 13 are covered by design sheet 12. In design sheet 12, the thicknesses of a part which overlaps opening portion 13*a*4 and a part which does not overlap opening portion 13*a*4 are the same as each other in plan view.

Second recessed portion 13*b* is a recess which is formed in a gap between adjacent first recessed portions 13*a*. Second recessed portion 13*b* is inclined to taper toward the Z-axis positive side. Second recessed portion 13*b* includes two side surface portions 13*a*1 and connection portion 13*b*1 between two side surface portions 13*a*1.

Connection portion 13*b*1 is a part of cushion layer 13 on the opposite side (Z-axis positive side) to sensor film 31 with respect to the dashed line in FIG. 5, is arranged in a part of the space between adjacent first recessed portions 13*a*, and connects adjacent first recessed portions 13*a* among a plurality of first recessed portions 13*a*. In the present embodiment, connection portion 13*b*1 is a part which connects the end portions of adjacent side surface portions 13*a*1 on the Z-axis positive side, and is arranged on the Z-axis positive side of cushion layer 13. Connection portion 13*b*1 forms the bottom surface of second recessed portion 13*b*. Connection portion 13*b*1 overlaps opening portion 13*b*3 in plan view, and is smaller than opening portion 13*b*3. The front surface (front surface 13*c*) of bottom surface portion 13*a*1 is, for example, provided in contact with design sheet 12.

Connection portion 13*b*1 is provided in a position which does not overlap bottom surface portion 13*a*2 in plan view. The thickness (wall thickness) of connection portion 13*b*1 is, for example, constant. The thickness (wall thickness) of connection portion 13*b*1 may be the same as the thickness (wall thickness) of bottom surface portion 13*a*2.

In second recessed portion 13*b*, space 13*b*2 and opening portion 13*b*3 are formed.

Space 13*b*2 is a space (gap) between adjacent first recessed portions 13*a*. Space 13*b*2 is surrounded by side surface portions 13*a*1 and connection portion 13*b*1. In space 13*b*2, for example, air is present. Space 13*b*2 is an elongated space in which a trapezoidal shape extends in the X-axis direction and in the Y-axis direction.

Opening portion 13*b*3 is a boundary between space 13*b*2 and the external space, and is covered by sensor film 31. In other words, opening portion 13*b*3 is formed on the opposite side of cushion layer 13 to the side which is operated by the user. All opening portions 13*b*3 formed in cushion layer 13 are covered by sensor film 31.

For example, side surface portion 13*a*1, bottom surface portion 13*a*2, and connection portion 13*b*1 are integrally formed. Side surface portion 13*a*1, bottom surface portion 13*a*2, and connection portion 13*b*1 are produced, for example, by molding a transparent silicone rubber. As described above, cushion layer 13 in the present embodiment is a rubber molded product whose cross-sectional shape is a recessed-projecting shape. A method for producing cushion layer 13 is not limited to the method described above.

When front cover portion 10 as described above is operated by the user, front cover 11 and design sheet 12 are bent to the Z-axis negative side, and cushion layer 13 is compressed to the Z-axis negative side. In other words, when front cover portion 10 is operated by the user, front cover portion 10 is locally deformed. Cushion layer 13 is compressed, and thus front cover portion 10 can provide a soft tactile sensation to the user. Since front cover portion 10 includes cushion layer 13 which is integrally formed over first regions 10*a* and second region 10*b*, even when the user operates (for example, makes contact with) either of first regions 10*a* and second region 10*b*, it is possible to provide a soft tactile sensation to the user.

When front cover 11 is pressed, cushion layer 13 is bent such that side surface portions 13*a*1 of a pressed part are extended outward in plan view, with the result that front surface 13*c* of cushion layer 13 approaches back surface 13*d*. In other words, cushion layer 13 is compressed and deformed such that the thickness of cushion layer 13 is decreased. It is also said that cushion layer 13 is buckled to be deformed. Since the thickness of cushion layer 13 is partially decreased (height is reduced), as compared with a case where the entire thickness of cushion layer 13 is decreased, the user can use a smaller force to press front cover 11. In other words, input device 1 includes cushion layer 13 to be able not only to provide a soft tactile sensation to the user but also to enhance the operability.

Since frame portion 30 is integrally formed over first regions 10*a* and second region 10*b* and is rigid, even when the user operates (for example, makes contact with) either of first regions 10*a* and second region 10*b*, frame portion 30 is moved in the Z-axis negative direction without being deformed. Hence, for example, as compared with a case where frame portion 30 is not moved even when second region 10*b* is operated, frame portion 30 is unlikely to cause the user to feel a difference in tactile sensation caused by whether frame portion 30 is moved.

In this way, input device 1 can provide the same soft tactile sensation whichever part of front cover portion 10 is touched (pressed) by the user, and thus it is possible to suppress the provision of discomfort to a tactile sensation. For example, when input device 1 is arranged in the position of an armrest or the like which is easily touched by the user, it is possible to suppress the provision of discomfort on a tactile sensation to the user. For example, when light source 33 is not lit, whichever part of front cover portion 10 is touched by the user, input device 1 can provide the same tactile sensation to the user, with the result that it is possible to suppress the provision of discomfort on a tactile sensation to the user. In other words, whichever part of front cover portion 10 is touched by the user without intent to operate the appliance, the user can feel the same tactile sensation.

For example, the user operates front cover portion 10, and thus cushion layer 13 is compressed and deformed. In other words, when vibration device 40 generates vibrations, cushion layer 13 is compressed. Hence, in input device 1, the vibrations are unlikely to be absorbed by cushion layer 13, and thus it is possible to effectively transmit the tactile sensation of vibration device 40 to the user (the finger of the user). When input device 1 includes a tact switch, the click feeling of the tact switch is unlikely to be absorbed by cushion layer 13, and thus input device 1 can effectively transmit the click feeling to the user. In other words, input device 1 can reduce discomfort to the tactile sensation provided to the user without impairing the haptic perception provided to the user.

[5. Configuration of Cushion Layer]

Figure 6A:
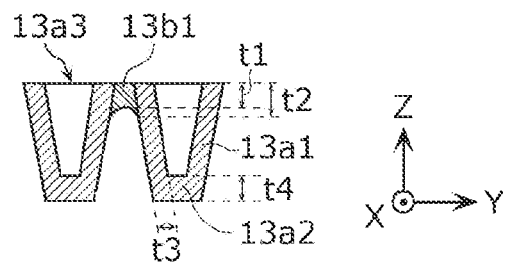
FIG. 6A is a cross-sectional view showing a first example of the cross-sectional shape of a cushion layer in the embodiment.
Figure 6B:
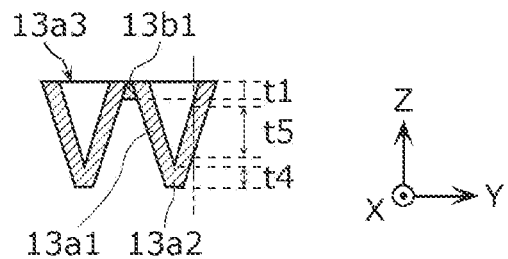
FIG. 6B is a cross-sectional view showing a second example of the cross-sectional shape of the cushion layer in the embodiment.
Figure 6C:
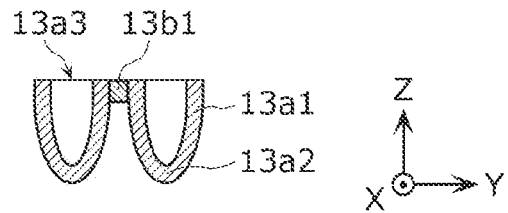
FIG. 6C is a cross-sectional view showing a third example of the cross-sectional shape of the cushion layer in the embodiment.

The configuration of cushion layer 13 will then be described with reference to FIGS. 6A to 7C. Other examples of the cross-sectional shape of cushion layer 13 will first be described with reference to FIGS. 6A to 6C. FIG. 6A is a cross-sectional view showing a first example of the cross-sectional shape of cushion layer 13 in the present embodiment. FIG. 6B is a cross-sectional view showing a second example of the cross-sectional shape of cushion layer 13 in the present embodiment. FIG. 6C is a cross-sectional view showing a third example of the cross-sectional shape of cushion layer 13 in the present embodiment. FIGS. 6A to 6C show two first recessed portions 13a and connection portion 13b1 which connects two first recessed portions 13a. Thicknesses t1 to t4 shown in FIGS. 6A and 6B indicate the wall thicknesses of corresponding constituent elements.

As shown in FIG. 6A, the thickness (wall thickness) of connection portion 13b1 does not need to be constant. For example, the thickness (wall thickness) of connection portion 13b1 may increase toward first recessed portions 13a. For example, thickness t2 of both ends of connection portions 13b1 may be greater than thickness t1 of a center portion of connection portions 13b1. When the thickness (wall thickness) of connection portion 13b1 is constant (for example, when the shape shown in FIG. 5 is provided), the thickness of connection portion 13b1 (that is, each of thickness t1 and thickness t2) may be greater than thickness t3. For example, the thickness of connection portion 13b1 (that is, each of thickness t1 and thickness t2) and thickness t4 of bottom surface portion 13a2 may be the same as each other, and thickness t3 of side surface portion 13a1 may be less than thicknesses t1, t2, and t4.

In this way, it is possible to suppress unevenness in the brightness (unevenness in brightness through the designs) of light passing through connection portions 13b1 and light passing through side surface portions 13a1.

Thickness t3 of side surface portion 13a1 is, for example, uniform, and thickness t4 of bottom surface portion 13a2 is, for example, uniform.

As shown in FIG. 6B, the inclination of side surface portion 13a1 may be increased as compared with that shown in FIG. 6A (may be brought close to a horizontal direction). In this case, since in terms of reducing discomfort to a tactile sensation, the size of opening portion 13a4 may be prevented from being changed, the width (in the example of FIG. 6B, the length in the Y-axis direction) of bottom surface portion 13a2 is decreased as compared with that shown in FIG. 6A. When the length of side surface portion 13a1 in a direction parallel to the Z axis is assumed to be t5, in terms of suppressing unevenness in brightness, length t5 may be the same as thicknesses t1 and t4. The direction parallel to the Z axis refers to a direction parallel to the optical axis of the light from light emitting elements 33c. In this case, space 13a3 is conic (for example, pyramidal or conical). Length t5 corresponds to a distance over which the light from light source 33 passes through the interior of side surface portion 13a1.

As shown in FIG. 6C, at least a part of first recessed portion 13a may be rounded.

Figure 7A:
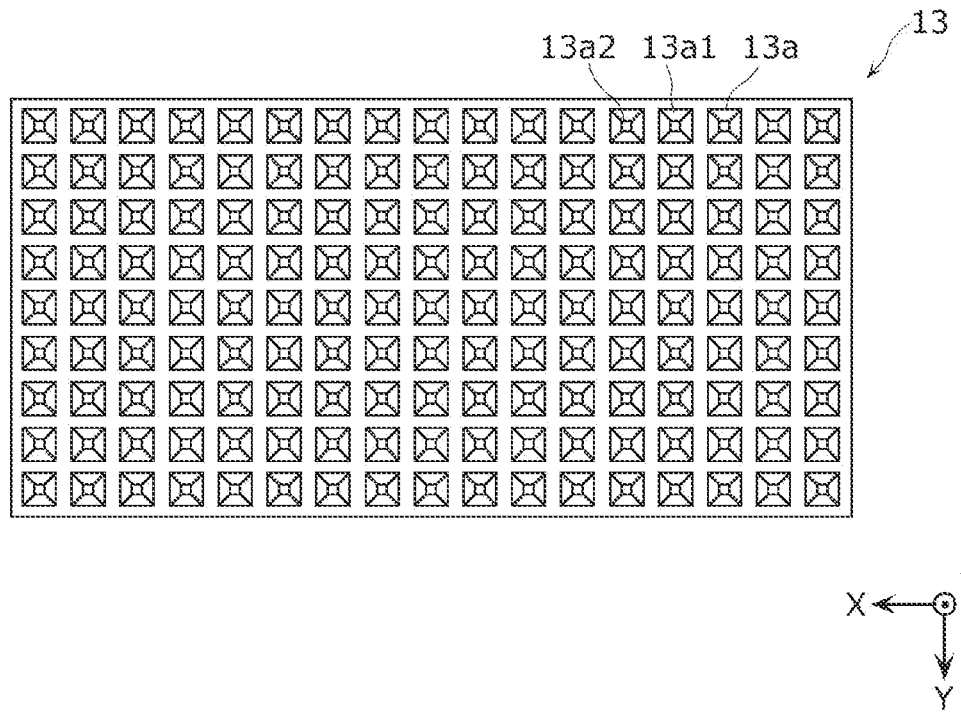
FIG. 7A is a plan view showing a first example of the plan view shape of first recessed portions formed in the cushion layer in the embodiment.
Figure 7B:
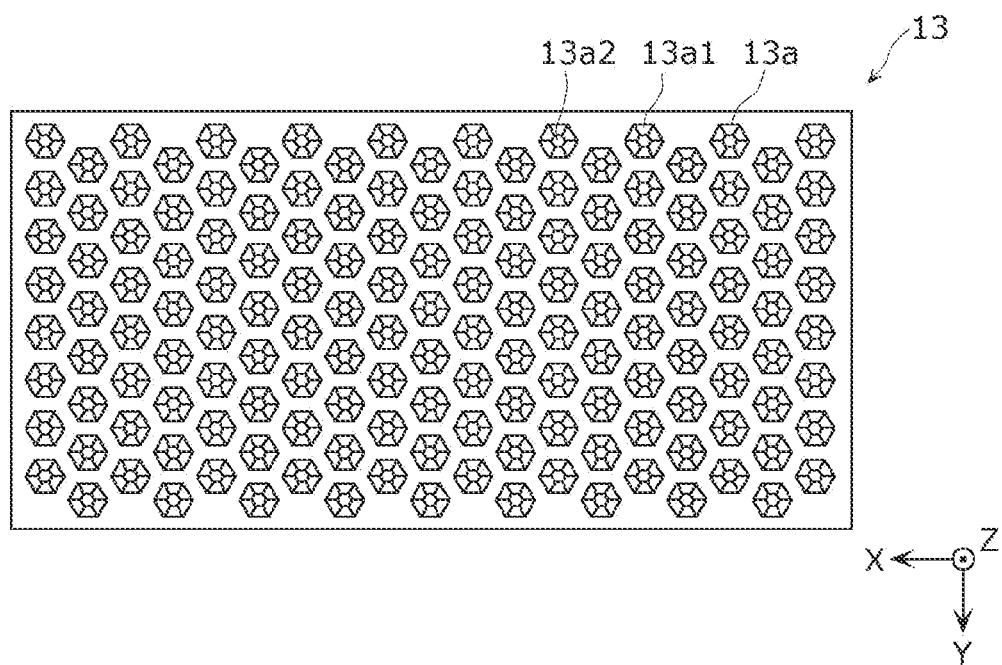
FIG. 7B is a plan view showing a second example of the plan view shape of the first recessed portions formed in the cushion layer in the embodiment.
Figure 7C:
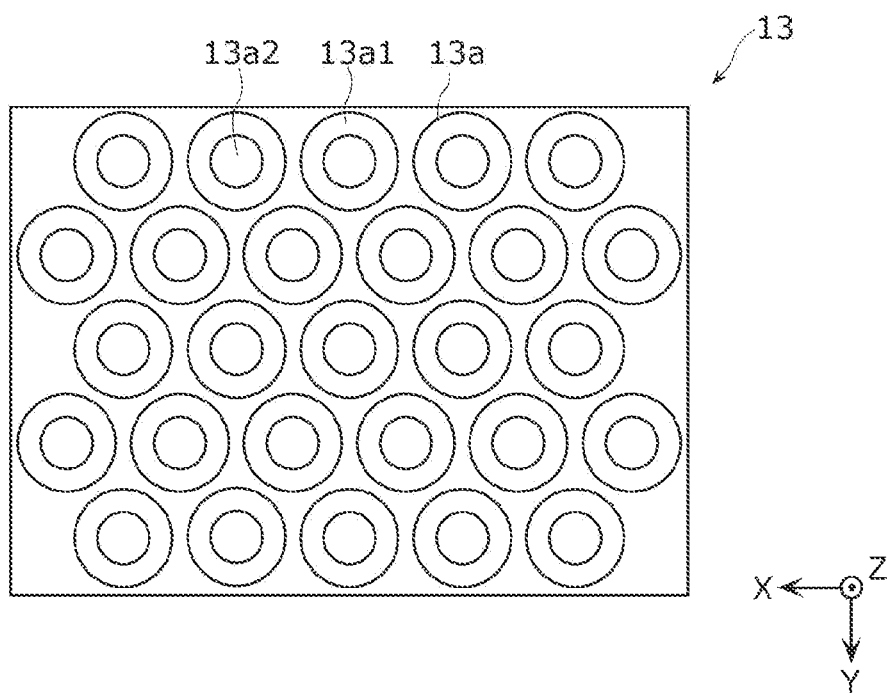
FIG. 7C is a plan view showing a third example of the plan view shape of the first recessed portions formed in the cushion layer in the embodiment.

The plan view shape of first recessed portions 13a in cushion layer 13 will then be described with reference to FIGS. 7A to 7C. FIG. 7A is a plan view showing a first example of the plan view shape of first recessed portions 13a formed in cushion layer 13 in the present embodiment. FIG. 7B is a plan view showing a second example of the plan view shape of first recessed portions 13a formed in cushion layer 13 in the present embodiment. FIG. 7C is a plan view showing a third example of the plan view shape of first recessed portions 13a formed in cushion layer 13 in the present embodiment.

As shown in FIG. 7A, the plan view shape (shape of opening portion 13a4) of first recessed portion 13a may be, for example, quadrangular (for example, square). A plurality of first recessed portions 13a are equally spaced. Although the first recessed portions 13a are arranged in a two-dimensional pattern (for example, a grid pattern), they may be arranged in a honeycomb shape at predetermined intervals. In the first recessed portions 13a, the distances between adjacent first recessed portions 13a may be the same as each other. In this case, space 13a3 is in the shape of a tetragonal pyramid.

In the case of FIG. 7A, spaces 13b2 are formed to linearly extend in the X-axis direction and in the Y-axis direction in plan view. Spaces 13b2 are formed in a grid pattern. For example, spaces 13b2 are formed to surround each of first recessed portions 13a in plan view.

The sizes and positions of first recessed portions 13a may be determined such that two or more first recessed portions 13a are superimposed on one design in plan view. First recessed portions 13a are formed both in the switch portions and the non-switch portion. In other words, spaces 13a3 in the same shape are formed both in the switch portions and the non-switch portion.

As shown in FIG. 7B, the plan view shape of first recessed portion 13a may be, for example, hexagonal (for example, in the shape of a regular hexagon). Although first recessed portions 13a are arranged, for example, in a honeycomb shape at predetermined intervals, first recessed portions 13a may be arranged in a grid pattern. In the first recessed portions 13a, for example, the distances between adjacent first recessed portions 13a may be the same as each other. In this case, space 13a3 is in the shape of a hexagonal pyramid.

The plan view shape of first recessed portion 13a may be polygonal such as triangular or pentagonal or may be circular as shown in FIG. 7C. In terms of ease of deformation when front cover 11 is pressed, the plan view shape of first recessed portion 13a may be quadrangular.

First recessed portions 13a are formed such that the density is the same in any region of the front surface thereof in plan view. The shapes and sizes of the first recessed portion 13a are the same as each other in plan view. Second recessed portions 13b are likewise formed such that the density is the same in any region of the front surface thereof, and the shapes and sizes thereof are the same as each other.

In the case of FIG. 7B, spaces 13b2 are formed to extend in a wavy shape in plan view in the X-axis direction and in the Y-axis direction. Spaces 13b2 are formed in a grid pattern. For example, spaces 13b2 are formed to surround each of first recessed portions 13a in plan view.

[6. Functional Configuration of Input Device]

Figure 8:
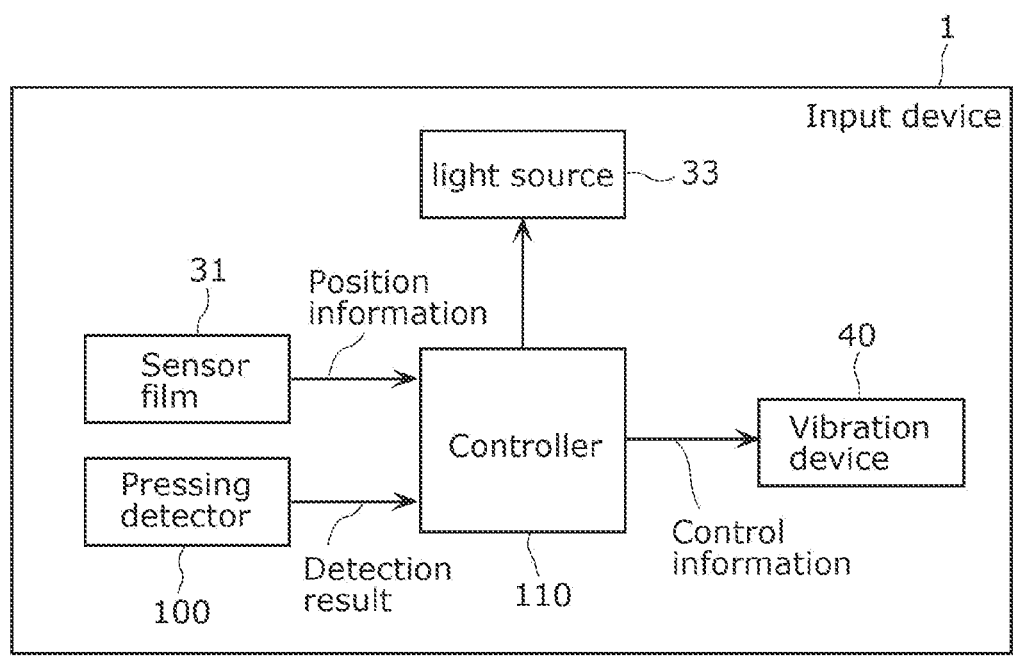
FIG. 8 is a block diagram showing the functional configuration of the input device according to the embodiment.

The functional configuration of input device 1 will then be described with reference to FIG. 8. FIG. 8 is a block diagram showing the functional configuration of input device 1 according to the present embodiment.

As shown in FIG. 8, input device 1 includes, as the functional configuration, sensor film 31, light source 33, vibration device 40, pressing detector 100, and controller 110.

Controller 110 is a control device which controls the constituent elements of input device 1. Controller 110 controls light source 33 to cause it to emit light, and thereby displays the designs. Controller 110 determines, based on position information from sensor film 31, which of the designs is operated by the user, and performs processing on control corresponding to the operated design. Controller 110 may execute processing which is performed by the electrostatic IC described above.

When controller 110 acquires, from pressing detector 100, the result of the detection indicating that the user operates front cover portion 10, controller 110 outputs control information for causing vibration device 40 to vibrate. For example, controller 110 acquires, from the result of the detection performed by pressing detector 100, information indicating that the user operates front cover portion 10, and acquires the position operated by the user (which of the designs is operated) based on the position information from sensor film 31. Then, controller 110 outputs, to the outside, a control signal corresponding to the design operated by the user. Furthermore, controller 110 may vibrate vibration device 40 under conditions (for example, a frequency, a vibration intensity, and the like) corresponding to the design operated by the user.

Although controller 110 acquires the result of the detection from pressing detector 100 when the user operates second region 10b, controller 110 does not acquire the position information from sensor film 31. In this case, controller 110 does not output the control information for causing vibration device 40 to vibrate. In other words, controller 110 does not vibrate vibration device 40. For example, when controller 110 acquires both the position information from sensor film 31 and the result of the detection from pressing detector 100, controller 110 outputs the control information for causing vibration device 40 to vibrate.

For example, controller 110 may be realized by a processor which executes programs for controlling the constituent elements and a memory which stores the programs or may be realized by a dedicated circuit. Controller 110 may be realized, for example, by an electronic control unit (ECU).

(Variations of Embodiment)

Variations of input device 1 in the embodiment will be described below with reference to FIGS. 9 to 13. In the variations, differences from the embodiment are mainly described, and the description of the same or similar details to those in the embodiment is omitted or simplified.

(Variation 1 of Embodiment)

Figure 9:
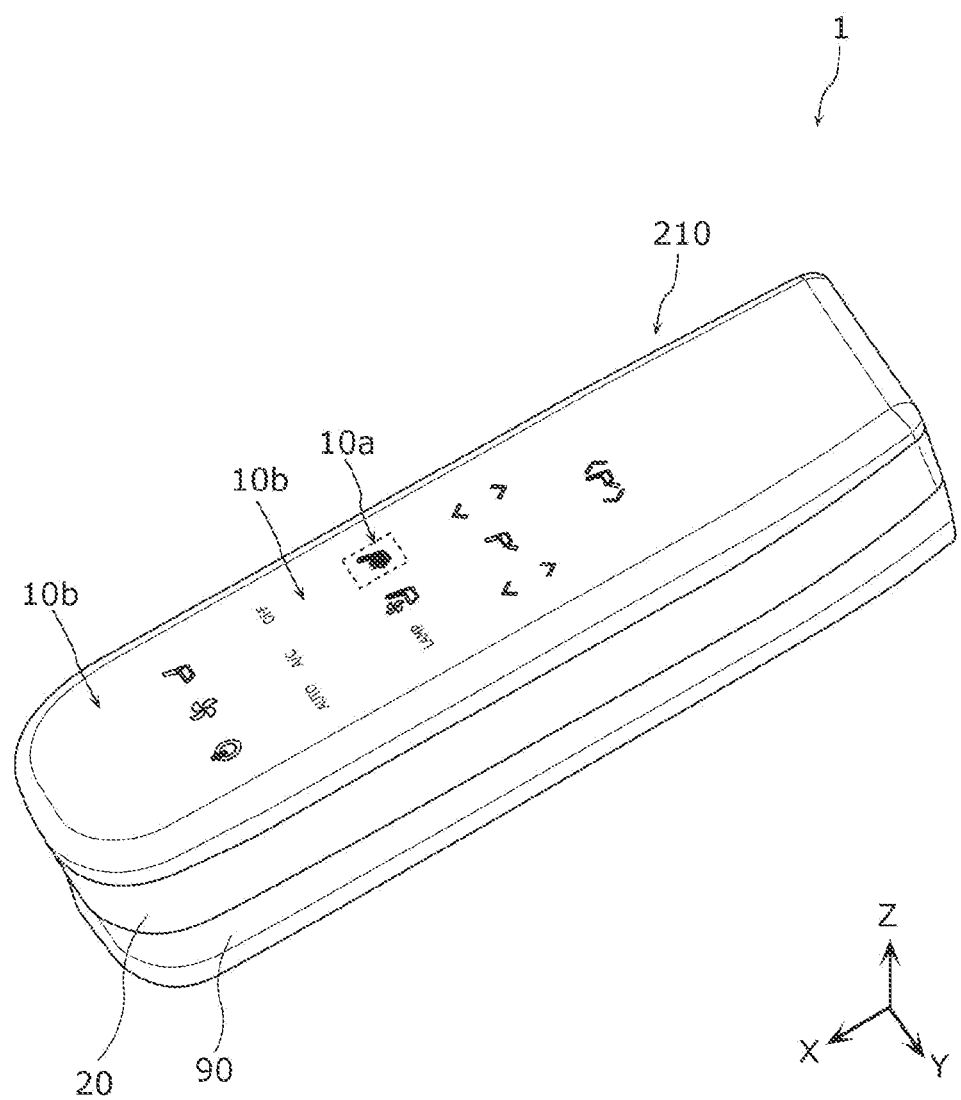
FIG. 9 is a perspective view showing the appearance of an input device according to Variation 1 of the embodiment.

Although in the above embodiment, an example where input device 1 includes upper covers 80 is described, the present disclosure is not limited to this example, and input device 1 does not need to include upper covers 80. The configuration of input device 1 which does not include upper covers 80 will be described with reference to FIG. 9. FIG. 9 is a perspective view showing the appearance of input device 1 according to the present variation.

As shown in FIG. 9, in input device 1, front cover portion 210 may be formed to cover the entire front surface of input device 1 in plan view. Here, the front surface refers to an XY plane (operation surface) including first regions 10a on which the designs are displayed. For example, a decorative layer in which front cover 11, design sheet 12, and cushion layer 13 are stacked in this order may cover the entire front surface of input device 1. In this case, over the entire front surface of input device 1, first recessed portions 13a and second recessed portion 13b are formed.

Frame portion 30 may be formed to cover the entire front surface of input device 1 in plan view. For example, frame portion 30 covers a region (for example, a plate-shaped region) of front cover portion 210 which can be touched by the user, and is arranged opposite the region described above.

In this way, whatever front surface of input device 1 is operated, input device 1 can provide the same tactile sensation to the user. Since input device 1 is seamless in the front surface, the appearance is enhanced, and the feeling of an operation can be made uniform over the entire front surface.

Front cover portion 210 is not limited to the front surface described above, and may cover the front surfaces including the front surfaces of main body 20 and lower cover 90. In this case, the same tactile sensation as on the operation surface can be obtained on the side surfaces of input device 1.

(Variation 2 of Embodiment)

Figure 10:
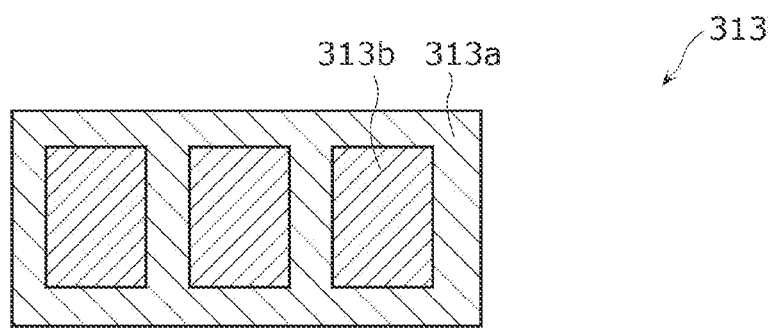
FIG. 10 is a plan view showing the configuration of a cushion layer in Variation 2 of the embodiment.
Figure 10:
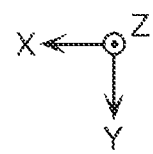

Although in the above embodiment, an example where cushion layer 13 is realized by one structure is described, the present disclosure is not limited to this example, and one or more block members may be fitted to form cushion layer 13. The configuration of cushion layer 13 including one or more block members will be described with reference to FIG. 10. FIG. 10 is a plan view showing the configuration of cushion layer 313 in the present variation.

As shown in FIG. 10, cushion layer 313 includes main body 313a and block members 313b. Although in the example of FIG. 10, three block members 313b are provided, the number of block members 313b is not particularly limited, and may be one, two, or four or more.

Main body 313a is a plate-shaped part which includes through holes (not shown) penetrating in the direction of thickness (Z-axis direction) and in which block members 313b are fitted into the through holes. Main body 313a is a part (second part) of cushion layer 313 which is superimposed, in plan view, on a region on which no design is formed. For example, main body 313a is a part which is superimposed on second region 10b in plan view.

Main body 313a is less in optical transmittance than block members 313b, and may be, for example, light-blocking. Being light-blocking means being relatively less in transmittance than an optically transmissive part, and may mean, for example, that the transmittance is less than 10% or that light is completely blocked (transmittance is substantially zero). Main body 313a may be transparent.

Although main body 313a is produced by molding, for example, a silicone rubber, the present disclosure is not limited to this configuration.

Block members 313b are fitted into the through holes formed in main body 313a. For example, block members 313b are detachably fitted into main body 313a. Block members 313b form a part (first part) of cushion layer 313 which is superimposed, in plan view, on regions on which the designs are formed. For example, block members 313b are a part which is superimposed on first regions 10a in plan view.

Block members 313b may be greater in optical transmittance than main body 313a. For example, block members 313b may be transparent or may be colored to be optically transmissive.

Although block members 313b are produced by molding, for example, a silicone rubber, the present disclosure is not limited to this configuration. The plan view shape of block members 313b is not limited to a rectangular shape.

Here, the cross-sectional shapes of main body 313a and block members 313b are the same as each other. In other words, in each of main body 313a and block members 313b, first recessed portions 13a and second recessed portions 13b (see FIG. 5) are formed. For example, first recessed portions 13a and second recessed portions 13b formed in main body 313a and first recessed portions 13a and second recessed portions 13b formed in block members 313b are the same in size, shape, and density. In this way, even when the user presses either of parts of front cover 11 which correspond to main body 313a and block member 313b, cushion layer 313 can provide the same tactile sensation to the user.

The present disclosure is not limited to a configuration in which main body 313a includes the through holes, and main body 313a may include, for example, recesses which are cylindrical with bottoms. For example, the upper surface (surface on the Z-axis positive side) of a bottom surface portion which forms the recess may abut on the bottom surface (surface on the Z-axis negative side) of block member 313b so as to regulate the movement of block member 313b in the Z-axis negative direction. In this way, the input device can suppress the movement of block members 313b in the Z-axis direction caused by vibrations of the vehicle or the like. In this case, at least the bottom surface portion of main body 313a is optically transmissive.

(Variation 3 of Embodiment)

Figure 11:
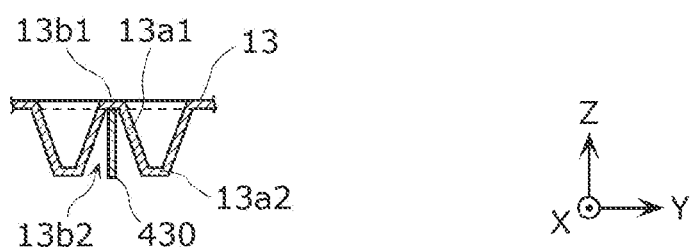
FIG. 11 is a cross-sectional view showing a light-blocking sheet arranged in the second recessed portion of a cushion layer in Variation 3 of the embodiment.

Although in the above embodiment, an example where no other members are arranged in spaces 13b2 of cushion layer 13 is described, the present disclosure is not limited to this example, and another member may be arranged in at least a part of a plurality of spaces 13b2. The configuration of cushion layer 13 in which another member (for example, a light-blocking sheet) is arranged in spaces 13b2 will be described with reference to FIGS. 11 to 12B. FIG. 11 is a cross-sectional view showing light-blocking sheet 430 arranged in second recessed portion 13b of cushion layer 13 in the present variation.

As shown in FIG. 11, input device 1 further includes light-blocking sheet 430 in second recessed portion 13b of cushion layer 13.

Light-blocking sheet 430 is a sheet-shaped member of a thin wall thickness which is provided to suppress the entrance of light passing through one of adjacent first recessed portions 13a into other first recessed portion 13a (to suppress leakage light). Light-blocking sheet 430 is arranged between adjacent first recessed portions 13a, that is, in space 13b2 between adjacent first recessed portions 13a. For example, light-blocking sheet 430 is inserted into space 13b2 of second recessed portion 13b. Light-blocking sheet 430 is less in optical transmittance than cushion layer 13. Light-blocking sheet 430 is light-blocking, and may be in black.

Light-blocking sheet 430 is formed such that when either of positions of front cover 11 corresponding to a part where light-blocking sheet 430 is arranged and a part where light-blocking sheet 430 is not arranged is pressed, the same tactile sensation can be provided to the user. For example, the thickness of light-blocking sheet 430 (in the example of FIG. 11, a length in the Y-axis direction which corresponds to the wall thickness of light-blocking sheet 430) may be less than the thickness (for example, thicknesses t1, t3, and t4) of cushion layer 13. For example, light-blocking sheet 430 may be produced by molding a silicone rubber.

Figure 12A:
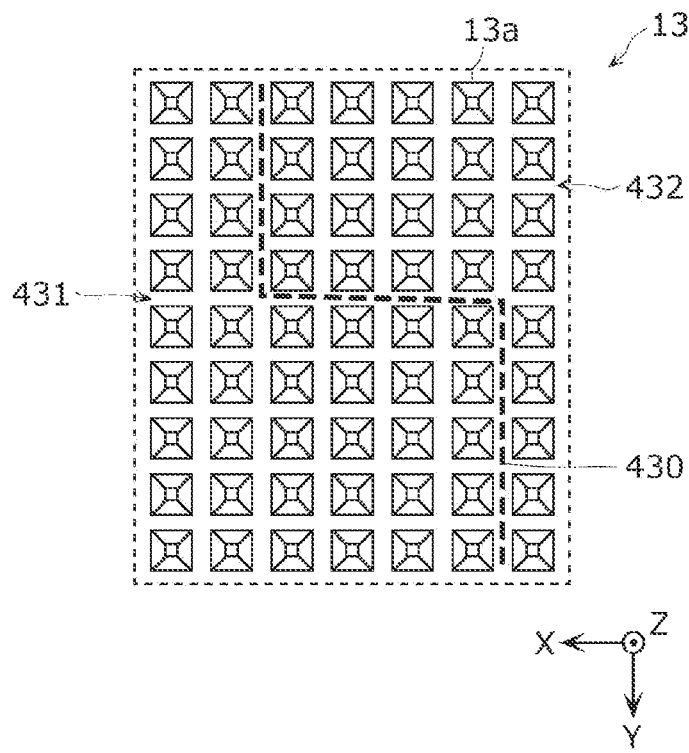
FIG. 12A is a plan view showing a first example of the arrangement of a light-blocking sheet in Variation 3 of the embodiment.
Figure 12B:
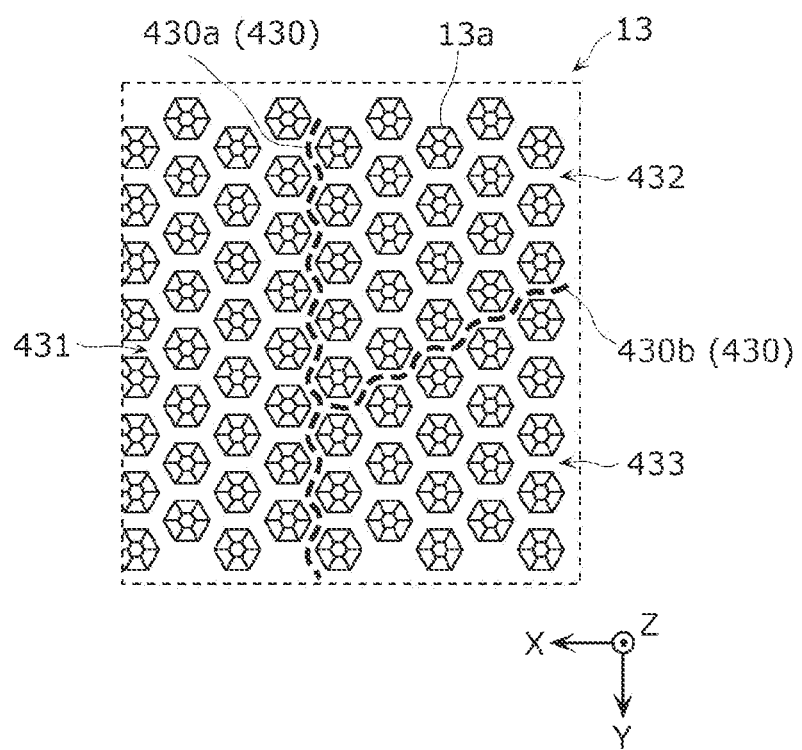
FIG. 12B is a plan view showing a second example of the arrangement of the light-blocking sheet in Variation 3 of the embodiment.

Here, examples of the arrangement of light-blocking sheet 430 will be described with reference to FIGS. 12A and 12B. FIG. 12A is a plan view showing a first example of the arrangement of light-blocking sheet 430 in the present variation. FIG. 12A shows an example of the arrangement of light-blocking sheet 430 when the plan view shape of first recessed portion 13a is quadrangular and first recessed portions 13a are arranged in a grid pattern. FIG. 12B is a plan view showing a second example of the arrangement of light-blocking sheet 430 in the present variation. FIG. 12B shows an example of the arrangement of light-blocking sheet 430 when the plan view shape of first recessed portion 13a is hexagonal and first recessed portions 13a are arranged in a honeycomb shape.

FIGS. 12A and 12B are plan views (views when the front surface of cushion layer 13 is seen) of cushion layer 13 when the Z-axis negative side is seen from the Z-axis positive side, and light-blocking sheet 430 is arranged on the back surface side of cushion layer 13 (that is, in spaces 13b2). In FIGS. 12A and 12B, only part of cushion layer 13 in plan view is shown.

As shown in FIG. 12A, light-blocking sheet 430 may be linearly arranged in plan view. In this way, cushion layer 13 can be partitioned into third region 431 and fourth region 432. Light-blocking sheet 430 blocks light which travels from one of third region 431 and fourth region 432 to the other. Third region 431 and fourth region 432 may be regions which are different from each other in the transmittance, the color, and the like of cushion layer 13. Light-blocking sheet 430 may be arranged to partition cushion layer 13 into regions in which at least one of the transmittance and the color is different. For example, when light-blocking sheet 430 is provided in cushion layer 313 shown in FIG. 10, light-blocking sheet 430 may be arranged to partition main body 313a and block members 313b. For example, light-blocking sheet 430 may be arranged in a ring shape surrounding block members 313b. For example, third region 431 and fourth region 432 may be regions in a state where only one of a design corresponding to third region 431 and a design corresponding to fourth region 432 is displayed.

As shown in FIG. 12B, light-blocking sheet 430 may be arranged in a wavy shape in plan view. A plurality of light-blocking sheets 430 may be arranged. In the example of FIG. 12B, light-blocking sheets 430a and 430b are arranged. In this way, cushion layer 13 can be partitioned into third region 431, fourth region 432, and fifth region 433. As described above, the number of light-blocking sheets 430 arranged may be appropriately determined according to the number of regions into which cushion layer 13 is partitioned. An end portion of light-blocking sheet 430b in the X-axis direction may abut on light-blocking sheet 430a.

Light-blocking sheet 430 is arranged in a wavy shape, and thus an effect of suppressing the separation of light-blocking sheet 430 can be expected.

(Variation 4 of Embodiment)

Figure 13:
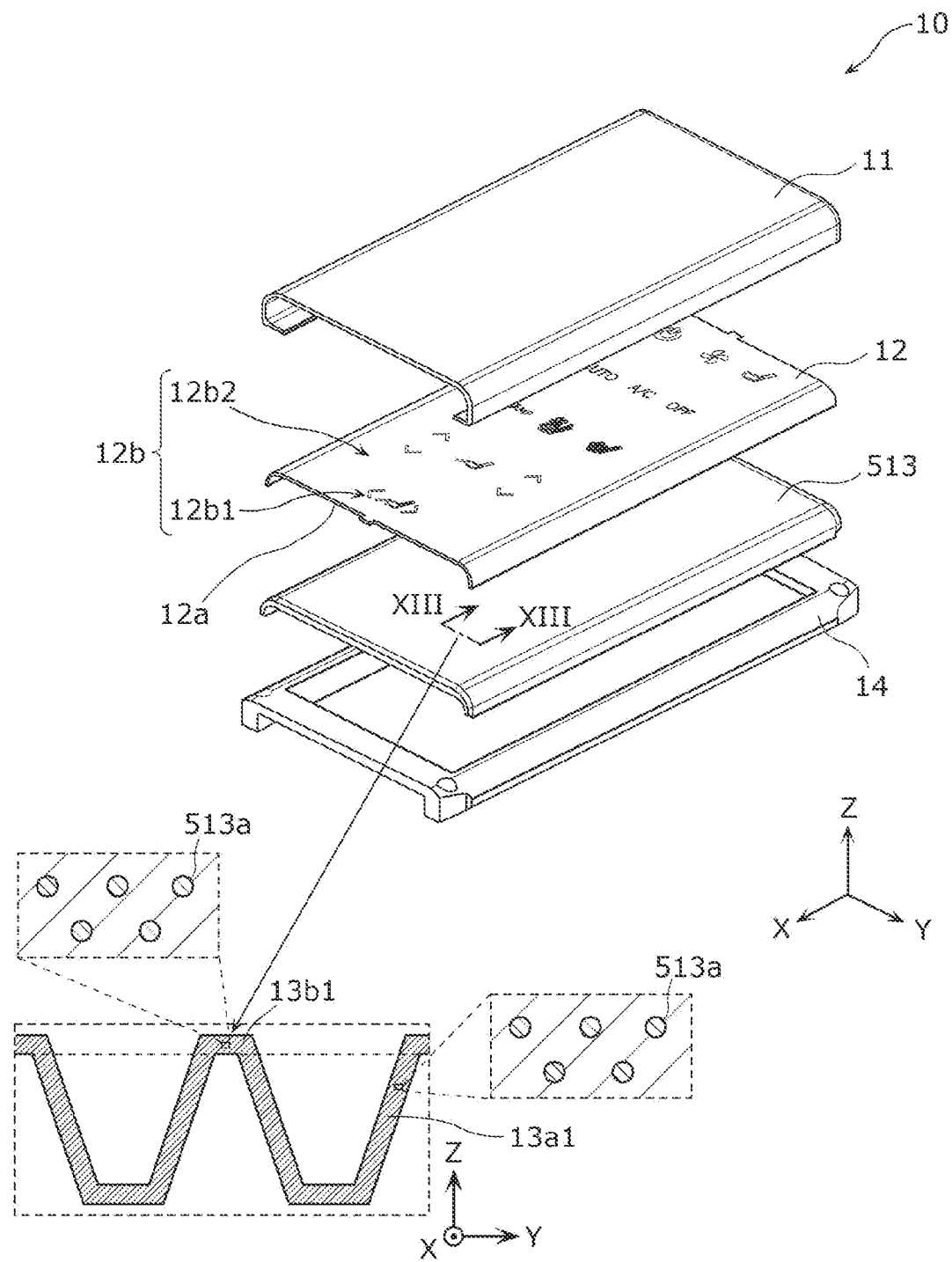
FIG. 13 is an exploded perspective view showing a front cover portion in Variation 4 of the embodiment.

Although in the above embodiment, an example where cushion layer 13 does not include light diffusing particles which have the function of diffusing light is described, the present disclosure is not limited to this example, and cushion layer 13 may include light diffusing particles. The configuration of cushion layer 13 including the light diffusing particles will be described with reference to FIG. 13. FIG. 13 shows an exploded perspective view showing front cover portion 510 in the present variation, and a cross-sectional view of cushion layer 513 taken along cutaway line XIII-XIII.

As shown in FIG. 13, front cover portion 510 includes cushion layer 513 instead of cushion layer 13 in front cover portion 10 of the embodiment.

Cushion layer 513 contains light diffusing particles 513a thereinside. Light diffusing particles 513a have a refractive index different from that of the material of cushion layer 513. In the present embodiment, light diffusing particles 513a have the refractive index different from that of a silicone rubber. Although light diffusing particles 513a are inorganic fine particles such as silica or glass beads, light diffusing particles 513a may be resin particles.

Light diffusing particles 513a are contained in each of first recessed portion 13a (for example, side surface portion 13a1 and bottom surface portion 13a2) and connection portion 13b1. Although light diffusing particles 513a are uniformly scattered and arranged inside cushion layer 513, the present disclosure is not limited to this configuration. As a method for manufacturing cushion layer 513 containing light diffusing particles 513a, any known method may be used.

Light diffusing particles 513a are not limited to a configuration in which light diffusing particles 513a are contained in cushion layer 513, and light diffusing particles 513a may be contained in design sheet 12 (for example, sheet portion 12a). When sheet portion 12a includes an optically transmissive silicone rubber, light diffusing particles 513a have a refractive index different from that of the silicone rubber.

As described above, light diffusing particles 513a are contained in at least one of design sheet 12 and cushion layer 513, and thus even when a plurality of first recessed portions are arranged to form cushion layer 13, it is possible to suppress the occurrence of unevenness in brightness.

(Variation 5 of Embodiment)

Figure 14:
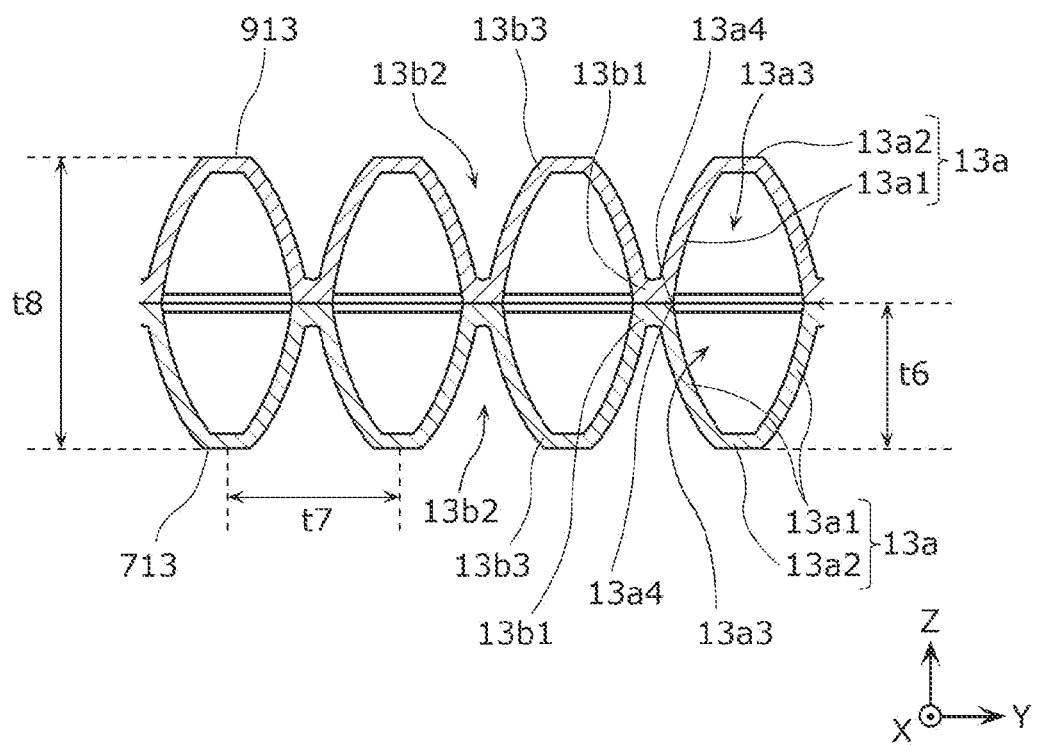
FIG. 14 is a cross-sectional view showing cross-sectional shapes of a first cushion layer and a second cushion layer in Variation 5 of the embodiment.

Although in the above embodiment, an example where one cushion layer 13 whose cross-sectional shape is recessed-projecting is provided is described, the present disclosure is not limited to this example, and two cushion layers which are stacked in the Z-axis direction may be provided. The configuration in which the two cushion layers stacked in the Z-axis direction are provided will be described with reference to FIG. 14. FIG. 14 is a cross-sectional view showing cross-sectional shapes of first cushion layer 713 and second cushion layer 913 in the present variation.

As shown in FIG. 14, an input device in the present variation includes, instead of cushion layer 13 in the embodiment, first cushion layer 713 and second cushion layer 913. The cushion layer is also said to include first cushion layer 713 and second cushion layer 913.

As in the embodiment described above, first cushion layer 713 includes a plurality of first recessed portions 13a each of which is in a projecting shape in the stacking direction and is in a recessed shape on the back side of the projecting shape. First recessed portion 13a is in a projecting shape in the downward direction (Z-axis negative direction), and is also said to include space 13a3 on the back side of a projecting portion (on the front surface side of cushion layer 13). First recessed portion 13a is a projecting portion of a thin wall thickness protruding in the downward direction, and is also said to be a projecting portion including opening portion 13a4 in the upward direction. First cushion layer 713 includes connection portion 13b1 which connects adjacent first recessed portions 13a.

Second cushion layer 913 is in a shape obtained by inverting first cushion layer 713 in the Z-axis direction, and includes a plurality of first recessed portions 13a each of which is in a projecting shape in the stacking direction and is in a recessed shape on the back side of the projecting shape. Second cushion layer 913 is also said to be in a shape obtained by turning first cushion layer 713 by 180 degrees with the X-axis used as a turning axis. First recessed portion 13a is in a projecting shape in the upward direction (Z-axis positive direction), and is also said to include space 13a3 on the back side of a projecting portion (back surface side of cushion layer 13). First recessed portion 13a is a projecting portion of a thin wall thickness protruding in the upward direction, and is also said to be a projecting portion including opening portion 13a4 in the downward direction. Second cushion layer 913 includes connection portion 13b1 which connects adjacent first recessed portions 13a.

As shown in FIG. 14, second cushion layer 913 is stacked in the upward direction (Z-axis positive direction) with respect to first cushion layer 713 such that connection portion 13b1 in first cushion layer 713 and connection portion 13b1 in second cushion layer 913 abut on each other.

Since second cushion layer 913 is in the shape obtained by inverting first cushion layer 713 in the Z-axis direction, the height (length t6 in the Z-axis direction) of first cushion layer 713 and the height (length in the Z-axis direction) of second cushion layer 913 are equal to each other. Moreover, a distance (in the cross-sectional view of FIG. 14, length t7 in the Y-axis direction) between adjacent first recessed portions 13a in first cushion layer 713 and a distance between adjacent first recessed portions 13a in second cushion layer 913 are equal to each other.

As described above, in terms of easily providing a soft tactile sensation to the user when the user operates front cover portion 10, the height (length in the Z-axis direction) of the cushion layer may be great.

Here, when in one cushion layer, a ratio between the height of the cushion layer and the distance between adjacent first recessed portions 13a is constant, as in the present variation, two cushion layers are stacked, and thus it is possible to reduce the distance between adjacent first recessed portions 13a with respect to the height of predetermined cushion layers.

For example, when a ratio between the height (length t6 in the Z-axis direction) of first cushion layer 713 and the distance (in the cross-sectional view of FIG. 14, length t7 in the Y-axis direction) between adjacent first recessed portions 13a is assumed to be a reference ratio, it is possible to relatively reduce the distance (in the cross-sectional view of FIG. 14, length t7 in the Y-axis direction) with respect to the height (length t8 in the Z-axis direction) of the entire cushion layers (first cushion layer 713 and second cushion layer 913 stacked). In other words, that the distance between adjacent first recessed portions 13a is relatively reduced corresponds to that the lengths of opening portion 13a4 and opening portion 13b3 are relatively reduced.

In this way, influences of opening portion 13a4 and opening portion 13b3 on a tactile sensation can be decreased, and thus the input device can further suppress the provision of discomfort on the tactile sensation to the user. The distance between adjacent first recessed portions 13a can be relatively reduced, and thus it is possible to further suppress an extreme change in brightness in a boundary between side surface portion 13a1 and connection portion 13b1, with the result that the input device can further improve the appearance of the designs of the input device.

As compared with a case where in one cushion layer, molding is performed such that the distance (in the cross-sectional view of FIG. 14, length t7 in the Y-axis direction) between adjacent first recessed portions 13a is reduced with respect to the height (length t8 in the Z-axis direction) of the entire cushion layer, it is possible to reduce the depths (lengths in the Z-axis direction) of spaces 13a3 and 13b2 in the cushion layers, with the result that it is possible to easily perform molding on the cushion layers.

Although in the example of FIG. 14, a case where the two cushion layers are stacked is described, three or more cushion layers may be stacked.

Other Embodiments

Although input devices 1 according to one or a plurality of aspects are described above based on the embodiment and the like, the present disclosure is not limited to the embodiment and the like. Embodiments obtained by performing various variations conceived by a person skilled in the art on the embodiment and the like, and embodiments obtained by combining constituent elements in different embodiments may be included in the present disclosure without departing from the spirit of the present disclosure.

For example, although in the above embodiment and the like, an example where front cover 11, design sheet 12, and cushion layer 13 are stacked in direct contact with each other in this order is described, the present disclosure is not limited to this example. Another plate-shaped layer may be provided at least one of an area between front cover 11 and design sheet 12 and an area between design sheet 12 and cushion layer 13. The plate-shaped layer may be a cushioning layer.

In the above embodiment and the like, the number of pressing detectors 100 included in input device 1 is not particularly limited, and the number may be one or two or more.

Although in the above embodiment and the like, an example where the designs are displayed by light passing through design sheet 12 is described, the present disclosure is not limited to this example, and in input device 1, the designs may be displayed by light blocked by design sheet 12.

Although in the above embodiment and the like, an example where light source 33 includes a plurality of light emitting elements 33b is described, light source 33 may be, for example, one planar light source.

Each of the height, the thickness, and the like in the above embodiment and the like may be any one of the average value, the central value, the mode value, the maximum value, and the minimum value of the corresponding length.

The division of functional blocks in the block diagram is an example, and a plurality of functional blocks may be realized as one functional block, one functional block may be divided into a plurality of parts, or some functions may be transferred to other functional blocks. A single piece of hardware or software may process, in parallel or in a timeshared manner, the functions of a plurality of functional blocks which have similar functions.

In the embodiments described above, constituent elements (for example, the controller) may be formed by dedicated hardware or may be realized by executing software programs suitable for the constituent elements. A program executor such as a CPU or a processor may read and execute software programs recorded in a recording medium such as a hard disk or a semiconductor memory so as to realize the constituent elements.

While the embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: Japanese Patent Application No. Japanese Patent Application No. 2021-209327 filed on Dec. 23, 2021, and Japanese Patent Application No. 2022-074459 filed on Apr. 28, 2022.

INDUSTRIAL APPLICABILITY

The present disclosure is useful for display devices and input devices installed in vehicles and the like.

The invention claimed is:

1. A display device comprising:
a front cover that is optically transmissive;
a design portion that is optically transmissive and is arranged on a front surface side or a back surface side of the front cover;
a cushion layer that is optically transmissive and is arranged on the back surface side of the front cover; and
a light source that is arranged on a back surface side of the cushion layer,
wherein the cushion layer includes a plurality of recessed portions each of which is, in a cross-sectional view taken along a plane parallel to a stacking direction of the front cover and the design portion, in a projecting shape in the stacking direction and is in a recessed shape on a back side of the projecting shape,
pyramidal or conical spaces are formed by the recessed shape on the back side of the projecting shape of the plurality of recessed portions,
the plurality of recessed portions are spaced,
the cushion layer includes a connection portion that connects adjacent recessed portions among the plurality of recessed portions, and
a light-blocking sheet is arranged between the adjacent recessed portions.

2. The display device according to claim 1,
wherein each of the plurality of recessed portions includes a bottom surface portion, and is inclined or curved to taper toward the bottom surface portion.

3. The display device according to claim 2,
wherein the recessed portion includes the bottom surface portion and a side surface portion that connects the bottom surface portion and the connection portion, and
a thickness of the connection portion is greater than a thickness of the side surface portion.

4. The display device according to claim 1,
wherein a thickness of the connection portion increases toward each of the plurality of recessed portions.

5. The display device according to claim 1,
wherein the cushion layer includes a first cushion layer and a second cushion layer,
each of the first cushion layer and the second cushion layer includes a plurality of recessed portions each of which is, in the cross-sectional view taken along the plane parallel to the stacking direction of the front cover and the design portion, in a projecting shape in the stacking direction and is in a recessed shape on a back side of the projecting shape,
the second cushion layer is in a shape obtained by inverting the first cushion layer in the stacking direction, and the second cushion layer is arranged on a side of the first cushion layer, the side facing the front cover.

6. The display device according to claim 1,
wherein the cushion layer includes:
 a first part that is superimposed, in plan view of the display device, on a design formed on the design portion; and
 a second part that is around the first part, and
the first part is greater in optical transmittance than the second part.

7. The display device according to claim 6,
wherein the first part is transparent or is colored to be optically transmissive, and
the second part is light-blocking.

8. The display device according to claim 1,
wherein the design portion is arranged to be superimposed, in the stacking direction, on the plurality of recessed portions and the connection portion.

9. The display device according to claim 1,
wherein the cushion layer includes a silicone rubber that is optically transmissive.

10. The display device according to claim 9,
wherein the cushion layer includes light diffusing particles whose refractive index is different from a refractive index of the silicone rubber.

11. The display device according to claim 1,
wherein the design portion includes a silicone rubber that is optically transmissive and light diffusing particles whose refractive index is different from a refractive index of the silicone rubber.

12. The display device according to claim 1,
wherein each of the plurality of recessed portions is quadrangular, hexagonal, or circular in plan view of the display device.

13. The display device according to claim 1,
wherein the design portion is a design sheet arranged on the back surface side of the front cover.

14. The display device according to claim 1,
wherein a wall thickness of the recessed portion is less than a wall thickness of the front cover or is less than a wall thickness of the design portion.

15. The display device according to claim 14,
wherein a height of the recessed shape is greater than the wall thickness of the design portion.

16. The display device according to claim 1,
wherein at least a part of the recessed portion is rounded.

\* \* \* \* \*